United States Patent
Sidiroglou et al.

(10) Patent No.: US 9,544,322 B2
(45) Date of Patent: *Jan. 10, 2017

(54) SYSTEMS, METHODS, AND MEDIA PROTECTING A DIGITAL DATA PROCESSING DEVICE FROM ATTACK

(71) Applicant: The Trustees of Columbia University in the City of New York, New York, NY (US)

(72) Inventors: Stylianos Sidiroglou, Astoria, NY (US); Angelos D. Keromytis, Yonkers, NY (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,233

(22) Filed: Aug. 31, 2015

(65) Prior Publication Data
US 2015/0373041 A1    Dec. 24, 2015

Related U.S. Application Data

(63) Continuation of application No. 13/774,825, filed on Feb. 22, 2013, now Pat. No. 9,143,518, which is a
(Continued)

(51) Int. Cl.
*G06F 11/00* (2006.01)
*H04L 29/06* (2006.01)
*H04L 12/58* (2006.01)

(52) U.S. Cl.
CPC ......... *H04L 63/1425* (2013.01); *H04L 12/585* (2013.01); *H04L 51/08* (2013.01);
(Continued)

(58) Field of Classification Search
CPC .. H04L 63/20; H04L 63/0263; H04L 63/0227; H04L 63/0428; H04L 63/1441; H04L 63/143; H04L 63/1446; H04L 12/585; H04L 51/12; G06F 21/564; G06F 21/565; G06F 21/64
(Continued)

(56) References Cited

U.S. PATENT DOCUMENTS

| | | | |
|---|---|---|---|
| 5,398,196 | A | 3/1995 | Chambers |
| 5,696,822 | A | 12/1997 | Nachenberg |

(Continued)

FOREIGN PATENT DOCUMENTS

| | | | |
|---|---|---|---|
| GB | 2277151 B | | 6/1997 |
| JP | 2002368820 A | | 12/2002 |

(Continued)

OTHER PUBLICATIONS

Aleph One, "Smashing the Stack for Fun and Profit", In Phrack, vol. 7, No. 49, Nov. 1996, pp. 1-25.
(Continued)

*Primary Examiner* — Hosuk Song
(74) *Attorney, Agent, or Firm* — Byrne Poh LLP

(57) ABSTRACT

In accordance with some embodiments of the disclosed subject matter, systems, methods, and media for protecting a digital data processing device from attack are provided. For example, in some embodiments, a method for protecting a digital data processing device from attach is provided, that includes, within a virtual environment; receiving at least one attachment to an electronic mail; and executing the al least one attachment; and based on the execution of the at least one attachment, determining whether anomalous behavior occurs.

21 Claims, 7 Drawing Sheets

Related U.S. Application Data continuation of application No. 12/063,733, filed as application No. PCT/US2006/032470 on Aug. 18, 2006, now Pat. No. 8,407,785.

(60) Provisional application No. 60/709,170, filed on Aug. 18, 2005.

(52) U.S. Cl.
CPC .......... *H04L 51/12* (2013.01); *H04L 63/1416* (2013.01); *H04L 63/1466* (2013.01)

(58) Field of Classification Search
USPC ...... 726/1, 11–15, 22–24; 713/176, 187–188
See application file for complete search history.

(56) References Cited

U.S. PATENT DOCUMENTS

| | | |
|---|---|---|
| 5,765,030 A | 6/1998 | Nachenberg et al. |
| 5,842,002 A | 11/1998 | Schnurer et al. |
| 5,889,943 A | 3/1999 | Ji et al. |
| 5,964,889 A | 10/1999 | Nachenberg |
| 5,968,113 A | 10/1999 | Haley et al. |
| 5,968,133 A | 10/1999 | Latham et al. |
| 5,978,917 A | 11/1999 | Chi |
| 6,067,535 A | 5/2000 | Hobson et al. |
| 6,079,031 A | 6/2000 | Haley et al. |
| 6,154,876 A | 11/2000 | Haley et al. |
| 6,347,374 B1 | 2/2002 | Drake et al. |
| 6,357,008 B1 | 3/2002 | Nachenberg |
| 6,609,196 B1 | 8/2003 | Dickinson et al. |
| 6,681,331 B1 | 1/2004 | Munson et al. |
| 6,698,016 B1 | 2/2004 | Ghizzoni |
| 6,701,440 B1 | 3/2004 | Kim et al. |
| 6,715,084 B2 | 3/2004 | Aaron et al. |
| 6,718,469 B2 | 4/2004 | Pak et al. |
| 6,775,780 B1 | 8/2004 | Muttik |
| 6,785,732 B1* | 8/2004 | Bates ............ G06F 21/56 709/232 |
| 6,785,818 B1 | 8/2004 | Sobel et al. |
| 6,873,988 B2 | 3/2005 | Herrmann et al. |
| 6,901,519 B1 | 5/2005 | Stewart et al. |
| 6,952,776 B1 | 10/2005 | Chess |
| 6,970,924 B1 | 11/2005 | Chu et al. |
| 6,983,380 B2 | 1/2006 | Ko |
| 7,065,657 B1 | 6/2006 | Moran |
| 7,069,583 B2 | 6/2006 | Yann et al. |
| 7,072,876 B1 | 7/2006 | Michael |
| 7,093,239 B1 | 8/2006 | Van der Made |
| 7,096,215 B2 | 8/2006 | Bates et al. |
| 7,107,618 B1 | 9/2006 | Gordon et al. |
| 7,146,305 B2 | 12/2006 | van der Made |
| 7,146,640 B2 | 12/2006 | Goodman |
| 7,155,708 B2 | 12/2006 | Hammes et al. |
| 7,185,367 B2 | 2/2007 | Munson |
| 7,225,343 B1 | 5/2007 | Honig et al. |
| 7,263,690 B1 | 8/2007 | Shapiro |
| 7,331,062 B2 | 2/2008 | Alagna et al. |
| 7,334,262 B2 | 2/2008 | Szor |
| 7,334,263 B2 | 2/2008 | Szor |
| 7,356,736 B2 | 4/2008 | Natvig |
| 7,373,524 B2 | 5/2008 | Motsinger et al. |
| 7,380,274 B2* | 5/2008 | Dickinson, III ...... H04L 12/585 380/282 |
| 7,392,543 B2 | 6/2008 | Szor |
| 7,409,717 B1 | 8/2008 | Szor |
| 7,412,723 B2 | 8/2008 | Blake et al. |
| 7,418,729 B2 | 8/2008 | Szor |
| 7,448,084 B1 | 11/2008 | Apap et al. |
| 7,487,544 B2 | 2/2009 | Schultz et al. |
| 7,490,266 B2 | 2/2009 | May |
| 7,490,268 B2 | 2/2009 | Keromytis et al. |
| 7,496,896 B2 | 2/2009 | Bley et al. |
| 7,496,898 B1 | 2/2009 | Vu |
| 7,506,170 B2 | 3/2009 | Finnegan |
| 7,523,500 B1 | 4/2009 | Szor et al. |
| 7,526,758 B2 | 4/2009 | Hasse et al. |
| 7,526,809 B2 | 4/2009 | Liang et al. |
| 7,577,991 B2 | 8/2009 | Huynh et al. |
| 7,603,715 B2 | 10/2009 | Costa et al. |
| 7,607,171 B1 | 10/2009 | Marsden et al. |
| 7,624,449 B1 | 11/2009 | Perriot |
| 7,627,893 B2* | 12/2009 | Corley .................... G06F 21/53 709/223 |
| 7,639,714 B2 | 12/2009 | Stolfo et al. |
| 7,644,441 B2 | 1/2010 | Schmid et al. |
| 7,647,589 B1 | 1/2010 | Dobrovolskiy et al. |
| 7,716,736 B2 | 5/2010 | Radatti et al. |
| 7,735,138 B2 | 6/2010 | Zhao |
| 7,748,038 B2 | 6/2010 | Olivier et al. |
| 7,788,699 B2 | 8/2010 | Largman et al. |
| 7,797,682 B2 | 9/2010 | Stocker |
| 7,818,781 B2 | 10/2010 | Golan et al. |
| 7,822,818 B2 | 10/2010 | Desouza et al. |
| 7,832,012 B2 | 11/2010 | Huddleston |
| 7,840,968 B1 | 11/2010 | Sharma et al. |
| 7,865,908 B2 | 1/2011 | Garg et al. |
| 7,877,807 B2 | 1/2011 | Shipp |
| 7,900,258 B2 | 3/2011 | van der Made |
| 7,913,306 B2 | 3/2011 | Apap et al. |
| 7,975,059 B2 | 7/2011 | Wang et al. |
| 7,979,889 B2* | 7/2011 | Gladstone ............... G06F 21/52 726/1 |
| 7,979,907 B2 | 7/2011 | Schultz et al. |
| 8,074,115 B2 | 12/2011 | Stolfo et al. |
| 8,108,929 B2 | 1/2012 | Agrawal |
| 8,135,994 B2 | 3/2012 | Keromytis et al. |
| 8,214,900 B1 | 7/2012 | Satish et al. |
| 8,341,743 B2 | 12/2012 | Rogers et al. |
| 8,407,785 B2* | 3/2013 | Sidiroglou ............ H04L 12/585 726/22 |
| 8,528,086 B1 | 9/2013 | Aziz |
| 8,601,322 B2 | 12/2013 | Stolfo et al. |
| 8,701,189 B2 | 4/2014 | Saraf et al. |
| 9,143,518 B2* | 9/2015 | Sidiroglou .......... H04L 63/1416 |
| 2001/0020255 A1 | 9/2001 | Hofmann et al. |
| 2002/0026605 A1 | 2/2002 | Terry |
| 2002/0066034 A1 | 5/2002 | Schlossberg et al. |
| 2002/0078382 A1 | 6/2002 | Sheikh et al. |
| 2002/0083175 A1 | 6/2002 | Afek et al. |
| 2002/0095607 A1 | 7/2002 | Lin-Hendel |
| 2002/0133721 A1 | 9/2002 | Adjaoute |
| 2002/0162026 A1 | 10/2002 | Neuman et al. |
| 2002/0194490 A1 | 12/2002 | Halperin et al. |
| 2003/0065926 A1 | 4/2003 | Schultz et al. |
| 2003/0070003 A1 | 4/2003 | Chong et al. |
| 2003/0145225 A1 | 7/2003 | Bruton et al. |
| 2003/0172305 A1 | 9/2003 | Miwa |
| 2003/0204632 A1 | 10/2003 | Willebeek-LeMair et al. |
| 2004/0015726 A1 | 1/2004 | Szor |
| 2004/0044912 A1 | 3/2004 | Connary et al. |
| 2004/0098618 A1 | 5/2004 | Kim et al. |
| 2004/0128543 A1 | 7/2004 | Blake et al. |
| 2004/0148520 A1 | 7/2004 | Talpade et al. |
| 2004/0153644 A1 | 8/2004 | McCorkendale et al. |
| 2004/0153823 A1 | 8/2004 | Ansari |
| 2004/0163079 A1 | 8/2004 | Noy et al. |
| 2005/0071655 A1 | 3/2005 | de Jong |
| 2005/0086333 A1 | 4/2005 | Chefalas et al. |
| 2005/0086630 A1 | 4/2005 | Chefalas et al. |
| 2005/0108562 A1 | 5/2005 | Khazan et al. |
| 2005/0166268 A1 | 7/2005 | Szor |
| 2005/0273854 A1 | 12/2005 | Chess et al. |
| 2006/0010495 A1 | 1/2006 | Cohen et al. |
| 2006/0021029 A1 | 1/2006 | Brickell et al. |
| 2006/0021054 A1 | 1/2006 | Costa et al. |
| 2006/0080678 A1 | 4/2006 | Bailey et al. |
| 2006/0112342 A1 | 5/2006 | Bantz et al. |
| 2006/0123244 A1 | 6/2006 | Gheorghescu et al. |
| 2006/0143688 A1 | 6/2006 | Futoransky et al. |
| 2006/0143709 A1 | 6/2006 | Brooks et al. |
| 2006/0168329 A1 | 7/2006 | Tan et al. |
| 2006/0264694 A1 | 11/2006 | Viole et al. |

(56) References Cited

U.S. PATENT DOCUMENTS

| | | | |
|---|---|---|---|
| 2006/0265694 | A1 | 11/2006 | Chilimbi et al. |
| 2006/0288415 | A1 | 12/2006 | Wong |
| 2007/0028220 | A1 | 2/2007 | Miller et al. |
| 2007/0283338 | A1 | 12/2007 | Gupta et al. |
| 2008/0016574 | A1 | 1/2008 | Tomaselli |
| 2008/0235764 | A1 | 9/2008 | Cohen et al. |
| 2008/0313734 | A1 | 12/2008 | Rozenberg et al. |
| 2009/0037682 | A1 | 2/2009 | Armstrong et al. |
| 2009/0038008 | A1 | 2/2009 | Pike |
| 2010/0037038 | A1 | 2/2010 | Bieswanger et al. |
| 2012/0167120 | A1 | 6/2012 | Hentunen |

FOREIGN PATENT DOCUMENTS

| | | |
|---|---|---|
| KR | 1020010089062 | 9/2001 |
| WO | WO/99/55052 | 10/1999 |
| WO | WO/99/63727 | 12/1999 |

OTHER PUBLICATIONS

Amarasinghe, S., "On the Run—Building Dynamic Program Modifiers for Optimization, Introspection, and Security", In Proceedings of the Conference on Programming Language Design and Implementation, Berlin, DE, Jun. 17-19, 2002, pp. 1-2.

Anderson, D. et al., "Next-Generation Intrusion Detection Expert System (NIDES): A Summary", Technical Report, SRI International , May 1995, pp. 1-47.

Apap, F. et al., "Detecting Malicious Software by Monitoring Anomalous Windows Registry Accesses", In Proceedings of the 5th International Symposium on Recent Advances in Intrusion Detection (RAID '02), Zurich, CH, Oct. 16-18, 2002, pp. 36-53.

Armstrong, D. et al., "Controller-Based Autonomic Defense System", In Proceedings of the 3rd Defense Advanced Research Project Agency Information Survivability Conference and Exposition, Washington, DC, US, Apr. 22-24, 2003, pp. 21-23.

Arnold, W. and Tesauro, T., "Automatically Generated WIN32 Heuristic Virus Detection", In Virus Bulletin Conference, Orlando, FL, US, Sep. 28-29, 2000, pp. 51-60.

Ashcraft, K. and Engler, D., "Using Programmer-Written Compiler Extensions to Catch Security Holes", In Proceedings of the 2002 IEEE Symposium on Security and Privacy (S&P '02), Berkeley, CA, US, May 12-15, 2002, pp. 143-159.

Avizienis, A., "The N-Version Approach to Fault-Tolerant Software", In IEEE Transactions on Software Engineering, vol. SE-11, No. 12, Dec. 1985, pp. 1491-1501.

Axelsson, S., "A Preliminary Attempt to Apply Detection and Estimation Theory to Intrusion Detection", Technical Report, Department of Computer Engineering, Chalmers University of Technology, Mar. 13, 2000, pp. 1-11.

Bace, R.G., "Intrusion Detection", 1st edition, Macmillan Technical Publishing, Jan. 2000, pp. 1-322.

Baecher, P. et al., "libemu", Jul. 22, 2011, pp. 1-6, available at: http://libemu.carnivore.it/.

Baratloo, A. et al., "Transparent Run-Time Defense Against Stack Smashing Attacks", In Proceedings of the 2000 USENIX Annual Technical Conference (ATEC '00), San Diego, CA, US, Jun. 18-23, 2000, pp. 251-262.

Barbara, D. et al., "An Architecture for Anomaly Detection", In Applications of Data Mining in Computer Security, Advances in Information Security, vol. 6 , May 31, 2002, pp. 63-76.

Barrantes, E.G. et al., "Randomized Instruction Set Emulation to Disrupt Binary Code Injection Attacks", In Proceedings of the 10th ACM Conference on Computer and Communications Security Conference (CCS '03), Washington, DC, US, Oct. 27-31, 2003, pp. 281-289.

Bauer, E. et al., "An Empirical Comparison of Voting Classification Algorithms: Bagging, Boosting, and Variants", In Machine Learning, vol. 36, No. 1-2, Jul. 1, 1999, pp. 105-139.

Baumgartner, K., "The ROP Pack", In Proceedings of the 20th Virus Bulletin International Conference, Vancouver, BC, CA, Sep. 29-Oct. 1, 2010, pp. 1-43.

Bell, T. et al., excerpts from "Modeling for Text Compression", In ACM Computing Surveys, vol. 21, No. 4, Dec. 1989, pp. 557-591.

Bellovin, S., "Distributed Firewalls", In ;login: Magazine, Nov. 1999, pp. 37-39.

Bhatkar, S. et al., "Address Obfuscation: An Efficient Approach to Combat a Broad Range of Memory Error Exploits", In Proceedings of the 12th USENIX Security Symposium (SSYM '03), Washington, DC, US, Aug. 4-8, 2003, pp. 105-120.

Bhattacharyya, M. et al., "MET: An Experimental System for Malicious Email Tracking", In Proceedings of the 2002 Workshop on New Security Paradigms, Virginia Beach, VA, US, Sep. 23-26, 2002, pp. 3-10.

Biles, S., "Detecting the Unknown with Snort and the Statistical Packet Anomaly Detection Engine (SPADE)", Technical Report, Computer Security Online Ltd., Tech Republic, 2003, pp. 1-9.

Bowyer, K. et al., "A Parallel Decision Tree Builder for Mining Very Large Visualization Datasets", In Proceedings of the IEEE International Conference on Systems, Man, and Cybernetics, Nashville, TN, US, Oct. 8-11, 2000, pp. 1888-1893.

Breiman, L., "Bagging Predictors", In Machine Learning, vol. 24, No. 2, Aug. 1, 1996, pp. 123-140.

Breiman, L., "Random Forests", In Machine Learning, vol. 45, No. 1, Oct. 1, 2001, pp. 5-32.

Brilliant, S. et al., "Analysis of Faults in an N-Version Software Experiment", In IEEE Transactions on Software Engineering, vol. 16, No. 2, Feb. 1990, pp. 238-247.

Bruening, D. et al., "An Infrastructure for Adaptive Dynamic Optimization", In Proceedings of the 1st IEEE Association for Computing Macinery International Symposium on Code Generation and Optimization, San Francisco, CA, US, Mar. 23-26, 2003, pp. 265-275.

Brunner, J., "The Shockwave Rider", Del Rey Books, Canada, 1975, pp. 1-248.

Buchanan, E. et al., "Return-Oriented Programming: Exploits Without Code Injection", Presentation, Black Hat USA, Las Vegas, NV, US, Aug. 2-7, 2008, pp. 1-53.

Bulba et al., "Bypassing StackGuard and StackShield", In Phrack Magazine, No. 56, May 1, 2000, pp. 1-8.

Caida, "OC48 Analysis—Trace Data Stratified by Applications", Technical Report, Center for Applied Internet Data Access, last modified Jul. 18, 2013, pp. 1, available at: http://www.caida.org/research/traffic-analysis/byapplication/oc48/port_analysis_app.xml.

Candea, G. and Fox, A., "Crash-Only Software", In Proceedings of the 9th Workshop on Hot Topics in Operating Systems (HotOS-IX), Lihue (Kauai), HI, US, May 18-21, 2003, pp. 67-72.

Cannady, J. and Harrell, J. "A Comparative Analysis of Current Intrusion Detection Technologies", In Proceedings of the Fourth Conference on Technology for Information Security (TISC '96), May 1996, pp. 1-17.

Cannady, J.D., excerpts from "An Adaptive Neural Network Approach to Intrusion Detection and Response", Nova Southeastern University, 2000, pp. 19-21.

CERT, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.

CERT, "Exploitation of Vulnerabilities in Microsoft RPC Interface", Technical Report, CERT Advisory CA-2003-19, Jul. 31, 2003, pp. 1-3.

CERT, "MS-SQL Server Worm", last updated Jan. 25, 2003, pp. 1-3, available at: http://www.cert.org/advisories/CA-2003-04.html.

CERT, "MyDoom.B Virus", last updated Jan. 30, 2004, pp. 1-5, available at: http://www.us-cert.gov/cas/alerts/SA04-028A.html.

CERT, "W32/Blaster Worm", last updated Aug. 14, 2003, pp. 1-3, available at: http://www.cert.org/advisories/CA-2003-20.html.

CERT, "W32/Sobig.F Worm", last updated Aug. 22, 2003, pp. 1-3, available at: http://www.cert.org/incident_notes/IN-2003-03.html.

(56) References Cited

OTHER PUBLICATIONS

Chan, P. et al., "A Machine Learning Approach to Anomaly Detection", Technical Report, Florida Institute of Technology, Mar. 2003, pp. 1-13.

Chaturvedi, A. et al., "Improving Attack Detection in Host-Based IDS by Learning Properties of System Call Arguments", In Proceedings of the IEEE Symposium on Security and Privacy, Oakland, CA, US, May 8-11, 2005, pp. 1-19.

Chebrolu, S., excerpts from "Feature Deduction and Ensemble Design of Intrusion Detection Systems", In Computers & Security, vol. 24, Jun. 2005, pp. 295-307.

Checkoway, S. et al., "Return-Oriented Programming Without Returns", In Proceedings of the 17th Association for Computing Machinery Conference on Computer and Communications Security, Chicago, IL, US, Oct. 4-8, 2010, pp. 559-572.

Chen, H. and Wagner, D., "MOPS: An Infrastructure for Examining Security Properties of Software", In Proceedings of the 9th ACM Conference on Computer and Communications Security (CCS '02), Washington, DC, US, Nov. 18-22, 2002, pp. 235-244.

Chen, P. et al., "DROP: Detecting Return-Oriented Programming Malicious Code", In Proceedings of the 5th International Conference on Information Systems Security, Berlin, DE, Dec. 14, 2009, pp. 163-177.

Chen, P.M. and Noble, B.D., "When Virtual is Better Than Real", In Proceedings of the 8th Workshop on Hot Topics in Operating System (HotOS '01), Elmau/Oberbayem, DE, May 20-23, 2001, pp. 133-138.

Chen, W. et al.,"Metasploit", last updated Jul. 2, 2013, pp. 1-13, available at: http://www.metasploit.com.

Chess, B., "Improving Computer Security Using Extended Static Checking", In Proceedings of the IEEE Symposium on Security and Privacy, Berkeley, CA, US, May 12-15, 2002, pp. 160-173.

Chew, M. and Song, D., "Mitigating Buffer Overflows by Operating System Randomization", Technical Report CMU-CS-02-197, Carnegie Mellon University, Dec. 2002, pp. 1-11.

Cho, S.B. and Han, S-J., "Two Sophisticated Techniques to Improve HMM-Based Intrusion Detection Systems", In Proceedings of the Sixth International Symposium on Recent Advances in Intrusion Detection (RAID '03), Pittsburgh, PA, US, Sep. 8-10, 2003, pp. 207-219.

Christodorescu, M. and Jha, S., "Static Analysis of Executables to Detect Malicious Patterns", In Proceedings of the 12th USENIX Security Symposium (SSYM '03), Washington, DC, US, Aug. 4-8, 2003, pp. 169-186.

Cisco Systems, Inc., "Using Network-Based Application Recognition and Access Control Lists for Blocking the 'Code Red' Worm at Network Ingress Points", Technical Report No. 27842, Aug. 2, 2006, pp. 1-8.

Cohen, F., "Computer Viruses: Theory and Experiments", In Computers & Security, vol. 6, No. 1, Feb. 1987, pp. 22-35.

Computer Economics, "Malicious Code Attacks Had $13.2 Billion Economic Impact in 2001", In Computer Economics, Sep. 2002, pp. 1, available at: http://www.computereconomics.com/cei/preess/pr92191.html.

Conover, M., "w00w00 On Heap Overflows", Technical Report, Jan. 1999, pp. 1-17, available at: http://www.w00w00.org/articles.html.

Corelan Team, "Corelan ROPDB", last updated Dec. 18, 2012, pp. 1-10, available at: https://www.corelan.befindex.php/security/corelan-ropdb/.

Cova, M. et al., "Detection and Analysis of Drive-by-Download Attacks and Malicious JavaScript Code", In Proceedings of the 19th International Conference on World Wide Web, Raleigh, NC, US, Apr. 26-30, 2010, pp. 281-290.

Cowap, C. et al., "FormatGuard: Automatic Protection From Printf Format String Vulnerabilites", In Proceedings of the 10th USENIX Security Symposium, Washington, DC, US, Aug. 13-17, 2001, pp. 191-199.

Cowan, C. et al., "PointGuard: Protecting Pointers From Buffer Overflow Vulnerabilities", In Proceedings of the 12th USENIX Security Symposium (SSYM '03), Washington, DC, US, Aug. 4-8, 2003, pp. 91-104.

Cowan, C. et al., "Stackguard: Automatic Adaptive Detection and Prevention of Buffer-Overflow Attacks", In Proceedings of the 7th USENIX Security Symposium (SSYM '98), San Antonio, TX, US, Jan. 26-29, 1998, pp. 63-78.

Cowan, C. et al., "SubDomain: Parsimonious Server Security", In Proceedings of the 14th USENIX System Administration Conference (LISA '00), New Orleans, LA, US, Dec. 3-8, 2000, pp. 341-354.

Crosby, S. et al., "Denial of Service via Algorithmic Complexity Attacks", In Proceedings of the 12th USENIX Security Symposium, Washington, DC, US, Aug. 4-8, 2003, pp. 29-44.

Cult Dead Cow, "Back Orifice", last accessed Jul. 2, 2013, pp. 1-2, available at: http://www.cultdeadcow.com/tools/bo.html.

Damashek, M., "Gauging Similarity with N-Grams: Language-Independent Categorization of Text", In Science, vol. 267, No. 5199, Feb. 10, 1995, pp. 843-848.

Dark-E, "AIM Recovery", last accessed Jul. 2, 2013, pp. 1, available at: http://www.dark-e.com/des/software/aim/index.shtml.

Davi, L. et al., "ROPdefender: A Detection Tool to Defend Against Return-Oriented Programming Attacks", last updated Mar. 19, 2010, pp. 1-21, available at: https://www.cs.jhu.edu/~s/teaching/cs460/2013-fall/ROPdefender.pdf.

Demsky, B. and Rinard, M.C., "Automatic Data Structure Repair for Self-Healing Systems", In Proceedings of the 1st Workshop on Algorithms and Architectures for Self-Managing Systems, San Diego, CA, US, Jun. 11, 2003, pp. 1-6.

Demsky, B. et al., "Automatic Detection and Repair of Errors in Data Structures", In Proceedings of the Programming Languages' Conference on Object Oriented Programming, Systems, Languages, and Applications, Anaheim, CA, US, Oct. 26-30, 2003, pp. 78-95.

Denning, D., "An Intrusion Detection Model", In IEEE Transactions on Software Engineering, vol. SE-13, No. 2, Feb. 1987, pp. 222-232.

Diamond Cs, "Diamond Computer System Products—DiamondCS RegistryProt", Jan. 23, 2001, pp. 1-2, available at: https://web.archive.org/web/20010123222600/http://www.diamondcs.com.au/html/registryprot.htm.

Didaci, L. et al., "Ensemble Learning for Intrusion Detection in Computer Networks", In Proceedings of the 8th Conference of the Italian Association of Artificial Intelligence (AIAA), Siena, IT, Sep. 2002, pp. 1-10.

Dierks, T. and Allen, C., "The TLS Protocol Version 1.0", Technical Report, Internet Engineering Task Force: RFC 2246, Jan. 1999, pp. 1-69, available at: http://www.ietf.org/rfc/rfc2246.txt.

Dietterich, T., "Ensemble Methods in Machine Learning", In Lecture Notes in Computer Science, vol. 1857, Dec. 2000, pp. 1-15.

Dietterich, T.G., "An Experimental Comparison of Three Methods for Constructing Ensembles of Decision Trees: Bagging, Boosting, and Randomization", In Machine Learning, vol. 40, No. 2, Aug. 1999, pp. 1-22.

Dolan-Gavitt, B., "Forensic Analysis of the Windows Registry in Memory", In Digital Investigation, vol. 5, Aug. 2008, pp. 526-532.

Dreger, H. et al., "Enhancing the Accuracy of Network-Based Intrusion Detection with Host-Based Context", In Proceedings of GI SIG SIDAR Conference on Detection of Intrusions and Malware and Vulnerability Assessment, Vienna, AT, Jul. 7-8, 2005, pp. 206-221.

Du, W., "Security Relevancy Analysis on the Registry of Windows NT 4.0", In Proceedings of the 15th Annual Computer Security Applications Conference (ACSAC '99), Phoenix, AZ, US, Dec. 6-10, 1999, pp. 331-338.

DuMouchel, W., "Computer Intrusion Detection Based on Bayes Factors for Comparing Command Transition Probabilities", Technical Report TR91, National Institute of Statistical Sciences, Feb. 1999, pp. 1-14.

Dunlap, G. et al., "ReVirt: Enabling Intrusion Analysis Through Virtual-Machine Logging and Replay", In Proceedings of the Fifth Symposium on Operating Systems Design and Implementation, Boston, MA, US, Dec. 9-11, 2002, pp. 211-224.

(56) References Cited

OTHER PUBLICATIONS

Egele, M. et al., "Defending Browsers Against Drive-By Downloads: Mitigating Heap-Spraying Code Injection Attacks", In Proceedings of the 6th International Conference on Detection of Intrusions and Malware, and Vulnerability Assessment, Como, IT, Jul. 9-10, 2009, pp. 88-106.

Endler, D., "Intrusion Detection Applying Machine Learning to Solaris Audit Data", In Proceedings of the 14th Annual Computer Security Applications Conference, Phoenix, AZ, US, Dec. 7-11, 1998, pp. 268-279.

Endler, D., "Intrusion Detection Using Solaris' Basic Security Module", last updated Nov. 3, 2010, pp. 1-8, available at: http://www.symantec.com/connect/articles/intrusion-detection-using-solaris-basic-security-module.

Engler, D. and Ashcraft, K., "RacerX: Effective, Static Detection of Race Conditions and Deadlocks", In Proceedings of the ACM Symposium on Operating Systems Principles (SOSP '03), Bolton Landing, NY, US, Oct. 19-22, 2003, pp. 237-252.

Erlingsson, U., "Low-Level Software Security: Attack and Defenses", Technical Report, Microsoft Corporation, Nov. 2007, pp. 1-44.

Eskin, E., "Adaptive Model Generation for Intrusion Detection Systems", In the Workshop on Intrusion Detection Systems ("WIDS"), 7th ACM Conference on Computer and Communications Security, Athens, GR, Nov. 1, 2000, pp. 1-14.

Eskin, E., "Anomaly Detection Over Noisy Data Using Learned Probability Distributions", In Proceedings of the 17th International Conference on Machine Learning, Stanford, CA, US, Jun. 29-Jul. 2, 2000, pp. 255-262.

Etoh, J., "GCC Extension for Protecting Applications From Stack-Smashing Attacks", Technical Report, IBM Research, Aug. 22, 2005, pp. 1-3, available at: http://www.trl.ibm.com/projects/security/ssp.

Fan, W. and Stolfo, S.J., "Ensemble-based Adaptive Intrusion Detection", In Proceedings of the Second SIAM International Conference on Data Mining, Arlington, VA, US, Apr. 11-13, 2002, pp. 41-58.

Fan, W. et al., "Using Artificial Anomalies to Detect Unknown and Known Network Intrusions", In Proceedings of IEEE International Conference on Data Mining (ICDM '01), San Jose, CA, US, Nov. 29-Dec. 2, 2001, pp. 123-130.

Fan, W., "Systematic Data Selection to Mine Concept-Drifting Data Streams", In Proceedings of the 10th ACM SIGKDD International Conference on Knowledge Discovery and Data Mining, Seattle, WA, US, Aug. 22-25, 2004, pp. 128-137.

Feng, H.H. et al., "Anomaly Detection Using Call Stack Information", In Proceedings of the IEEE Symposium on Security and Privacy (S&P '03), Oakland, CA, US, May 11-14, 2003, pp. 62-77.

Flack, C. and Atallah, M.J., "A Toolkit for Modeling and Compressing Audit Data", Technical Report, Purdue University, Mar. 10, 1999, pp. 1-25.

Ford, R., "The Future of Virus Detection", Information Security Technical Report, vol. 9, No. 2, Apr.-Jun. 2004, pp. 19-26.

Forrest, S. et al., "A Sense of Self for Unix Processes", In Proceedings of the IEEE Symposium on Security and Privacy, Oakland, CA, US, May 6-8, 1996, pp. 120-128.

Forrest, S. et al., "Building Diverse Computer Systems", In Proceedings of the 6th Workshop on Hot Topics in Operating Systems (HotOS '97), Cape Cod, MA, US, May 5-6, 1997, pp. 67-72.

Frantzen, M. and Shuey, M., "StackGhost: Hardware Facilitated Stack Protection", In Proceedings of the 10th USENIX Security Symposium (SSYM '01), Washington, DC, US, Aug. 13-17, 2001, pp. 55-66.

Friedman, N. et al., "Efficient Bayesian Parameter Estimation in Large Discrete Domains", In Proceedings of the 11th Conference on Advances in Neural Information Processing Systems, Denver, CO, US, Nov. 30-Dec. 5, 1998, pp. 417-423.

Garfinkel, T. et al., "A Virtual Machine Introspection Based Architecture for Intrusion Detection", In Proceedings of the 10th Network and Distributed System Security Symposium (NDSS '03), San Diego, CA, US, Feb. 6-7, 2003, pp. 191-206.

Garfinkel, T., "Traps and Pitfalls: Practical Problems in System Call Interposition Based Security Tools", In Proceedings of the Network and Distributed Systems Security Symposium (NDSS '03), San Diego, CA, US, Feb. 6-7, 2003, pp. 163-176.

Geer, Jr., D., "Monopoly Considered Harmful", In IEEE Security & Privacy, vol. 1, No. 6, Nov. 2003, pp. 14-17.

Ghosh, A. et al., "A Study in Using Neural Networks For Anomaly and Misuse Detection", In Proceedings of the 8th USENIX Security Symposium, Washington, DC, US, Aug. 23-26, 1999, pp. 1-12.

Ghosh, A.K. et al. "Learning Program Behavior Profiles for Intrusion Detection", In Proceedings of the Workshop on Intrusion Detection and Network Monitoring, Santa Clara, CA, US, Apr. 9-12, 1999, pp. 51-62.

Ghosh, A.K. et al., "Using Program Behavior Profiles for Intrusion Detection", In Proceedings of the SANS Third Conference and Workshop on Intrusion Detection and Response, Mar. 1999, pp. 1-7.

Goldberg, I. et al., "A Secure Environment for Untrusted Helper Applications (Confining the Wily Hacker)", In Proceedings of the 6th USENIX Security Symposium (SSYM '96), San Jose, CA, US, Jul. 22-25, 1996, pp. 1-14.

Goth, G., "Addressing the Monoculture", In IEEE Security & Privacy, vol. 99, No. 6, Nov./Dec. 2003, pp. 8-10.

Greyware, "Grr! Greyware Registry Rearguard", Aug. 17, 2000, pp. 1-7, available at: https://web.archive.org/web/20000817031817/http://www.greyware.com/software/grr/.

Grimes, R.A., "Malicious Mobile Code: Virus Protection for Windows", 1st Edition, Aug. 2001, pp. 45-46.

Hall, L.O. et al., "Comparing Pure Parallel Ensemble Creation Techniques Against Bagging", In Proceedings of the Third IEEE International Conference on Data Mining (ICDM '03), Melbourne, FL, US, Nov. 19-22, 2003, pp. 533-536.

Hangal, S. and Lam, M.S., "Tracking Down Software Bugs Using Automatic Anomaly Detection", In Proceedings of the 24th International Conference on Software Engineering (ICSE '02), Orlando, FL, US, May 19-25, 2002, pp. 291-301.

Hedbom, H. et al., "A Security Evaluation of a Non-Distributed Version of Windows Nt", In Proceedings of the Second Nordic Workshop on Secure Computer Systems (NORDSEC '97), Espoo, FI, Nov. 6-7, 1997, pp. 1-29.

Hennessy, J.L. and Patterson, D.A., "Computer Organization and Design: The Hardware/Software Interface," 2nd Edition, Aug. 1997, pp. 1-122.

Hensing, R., "Understanding DEP as a Mitigation Technology", last updated Jun. 12, 2009, pp. 1-5, available at: http://blogs.technet.com/b/srd/archive/2009/06/12/understanding-dep-as-a-mitigation-technology-part-1.aspx.

Hoagland, J. and Staniford, S., "SPADE: Silicon Defense", Nov. 2000, pp. 1-4, available at: http://www.silicondefense.com/software/spice.

Hochberg, J.G. et al.,"NADIR: A Prototype System for Detecting Network and File System Abuse", Technical Report, Los Alamos National Laboratory, Nov. 1992, pp. 1-22.

Hofmeyr, S. et al., "Intrusion Detection System Using Sequences of System Calls", In Journal of Computer Security, vol. 6, No. 3, Aug. 18, 1998, pp. 151-180.

Hoglund, G.W. et al., excerpts from "The 'Essence' of Intrusion Detection: A Knowledge Based Approach to Security Monitoring and Control", In Procedings of the 7th Int. Conf. in Industrial and Engineering Applications of Artificial Intelligence and Expert Systems, Austin, TX, US, May 31-Jun. 3, 1994, pp. 201-209.

Hollander, Y., "The Future of Web Server Security: Why Your Web Site is Still Vulnerable to Attack", Technical Report, 2001, pp. 1-9.

Holmes, L., "Windows PowerShell Cookbook", 2nd edition, O'Reilly Media, Aug. 2010, pp. 1-4.

Honig, A. et al., "Adaptive Model Generation: An Architecture for the Deployment of Data Mining-Based Intrusion Detection Systems", In Applications of Data Mining in Computer Security, May 2002, pp. 153-194.

Ilgun, K., excerpts from "USTAT: A Real-Time Intrusion Detection System for Unix", In Proceedings of the 1993 IEEE Computer

(56) References Cited

OTHER PUBLICATIONS

Society Symposium on Research in Security and Privacy, Oakland, CA, US, May 24-26, 1993, pp. 16-28.

Inoue, H. and Forrest, S., "Anomaly Intrusion Detection in Dynamic Execution Environments", In New Security Paradigms Workshop, Virginia Beach, VA, US, Sep. 23-26, 2002, pp. 52-60.

Inoue, H. and Forrest, S., "Generic Application Intrusion Detection", Technical Report, University of New Mexico, Mar. 26, 2002, pp. 1-14.

International Patent Application No. PCT/US2006/015080, filed Apr. 21, 2006.

International Patent Application No. PCT/US2006/041591, filed Oct. 25, 2006.

International Patent Application No. PCT/US2012/055824, filed Sep. 17, 2012.

International Preliminary Report on Patentability dated Mar. 18, 2014 in International Patent Application No. PCT/US2012/055824.

International Preliminary Report on Patentability dated Mar. 19, 2009 in International Patent Application No. PCT/US2006/015080.

International Preliminary Report on Patentability dated Apr. 2, 2009 in International Patent Application No. PCT/US2006/041591.

International Preliminary Report on Patentability dated Apr. 30, 2009 in International Patent Application No. PCT/US2006/032470.

International Search Report dated May 14, 2008 in International Patent Application No. PCT/US2006/032470.

International Search Report dated Jun. 25, 2008 in International Patent Application No. PCT/US2006/041591.

International Search Report dated Jul. 7, 2008 in International Patent Application No. PCT/US2006/015080.

International Search Report dated Dec. 7, 2012 in International Patent Application No. PCT/US2012/055824.

Internet Engineering Task Force, "Intrusion Detection Exchange Format", last updated Oct. 15, 2010, pp. 1-2, available at: http://datatracker.ietf.org/wg/idwg/charter/.

Intrusion Inc. Product Website, Feb. 14, 2001, pp. 1, available at: https://web.archive.org/web/20010214040305/http://www.intrusion.com/Products/enterprise.shtml.

Ioannidis, J. et al, "Implementing Push-Back: Router-Based Defense Against DDoS Attacks", In Proceedings of the 9th Annual Symposium on Network and Distributed System Security, San Diego, CA, US, Feb. 2002, pp. 1-8.

Ioannidis, S. et al., "Implementing a Distributed Firewall", In Proceedings of the 7th ACM Conference on Computer and Communications Security (CCS '00), Athens, GR, Nov. 1-4, 2000, pp. 190-199.

Islam, M.M., "A Constructive Algorithm for Training Cooperative Neural Network Ensembles", In IEEE Transactions on Neural Networks, vol. 14, No. 4, Jul. 2003, pp. 820-834.

Janakiraman, R. et al., "Indra: A Peer-to-Peer Approach to Network Intrusion Detection and Prevention", In Proceedings of the 12th IEEE International Workshops on Enabling Technologies: Infrastructure for Collaborative Enterprises, Linz, AT, Jun. 9-11, 2003, pp. 226-231.

Javitz, H.S. and Valdes, A., "The NIDES Statistical Component: Description and Justification", Technical Report, SRI International, Computer Science Laboratory, Mar. 7, 1994, pp. 1-47.

Jim, T. et al., "Cyclone: A Safe Dialect of C", In Proceedings of the USENIX Annual Technical Conference (ATEC '02), Monterey, CA, US, Jun. 10-15, 2002, pp. 275-288.

Jones, R. et al., "Backwards-Compatible Bounds Checking for Arrays and Pointers in C Programs", In Proceedings of the Third International Workshop on Automated Debugging, Linköping, SE, May 26-28, 1997, pp. 13-26.

Just, J.E. et al.,"Learning Unknown Attacks—A Start", In Proceedings of the 5th International Symposium on Recent Advances in Intrusion Detection (RAID '02), Zurich, CH, Oct. 16-18, 2002, pp. 158-176.

Kane Secure Enterprise, excerpts from "Detecting Administrator and Super User Misuse (Kane I)", 2000, pp. 1.

Kane Secure Enterprise, excerpts from "Detecting Stolen Passwords (Kane II)", 2000, pp. 1.

Kane Security Analyst, excerpts from "Kane Security Analyst Features & Benefits (Kane III)", 2000, pp. 2-3.

Kane, excerpts from "Advancing the Art of Intrusion Detection: The KSE Behavioral Profiling System (Kane IV)", 2000, pp. 2-5.

Kc, G.S. et al., "Countering Code-Injection Attacks With Instruction-Set Randomization", In Proceedings of the ACM Computer and Communications Security (CCS '03) Conference, Washington, DC, US, Oct. 27-30, 2003, pp. 272-280.

Kean, E., "COSAK: Code Security Analysis Kit", Technical Report, Drexel University, Jan. 2004, pp. 1-17.

Kent, S. AND Atkinson, R., "Security Architecture for the Internet Protocol", Technical Report, RFC 2401, Nov. 1998, pp. 1-60.

Kephart, J.O. et al., "A Biologically Inspired Immune System for Computers", In Artificial Life IV: Proceedings of the 4th International Workshop on the Synthesis and Simulation of Living Systems, Cambridge, MA, US, Jul. 6-8, 1994, pp. 130-139.

Kim, G.H. and Spafford, E.H., "Experiences with Tripwire: Using Integrity Checkers for Intrusion Detection", Purdue Technical Report, Feb. 1994, pp. 1-15.

Kim, G.H. and Spafford, E.H., "The Design and Implementation of Tripwire: A File System Integrity Checker", Purdue Technical Report, Nov. 1993, pp. 1-23.

Kim, G.H. and Spafford, E.H., "Writing, Supporting, and Evaluating Tripwire: A Publically Available Security Tool", Purdue Technical Report, Mar. 1994, pp. 1-25.

King, S.T. and Chen, P.M., "Backtracking Intrusions", In Proceedings of the 19th ACM Symposium on Operating Systems Principles 2003 (SOSP '03), Bolton Landing, NY, US, Oct. 19-22, 2003, pp. 223-236.

King, S.T. et al., "Operating System Support for Virtual Machines", In Proceedings of the USENIX Annual Technical Conference (ATEC '03), San Antonio, TX, US, Jun. 9-14, 2003, pp. 71-84.

Kiriansky, V. et al., "Secure Execution Via Program Shepherding", In Proceedings of the 11th USENIX Security Symposium (SSYM '02), San Francisco, CA, US, Aug. 5-9, 2002, pp. 191-205.

Klinkenberg, R., "Detecting Concept Drift with Support Vector Machines", In Proceedings of the Seventeenth International Conference on Machine Learning, Stanford, CA, US, Jun. 29-Jul. 2, 2000, pp. 1-8.

Kodialam, M. and Lakshman, T.V., "Detecting Network Intrusions via Sampling: A Game Theoretic Approach", In Proceedings of the 22nd Annual Joint Conference of the IEEE Computer and Communications Societies (INFOCOM '03), San Franciso, CA, US, Mar. 30-Apr. 3, 2003, pp. 1-10.

Kolter, J.Z. and Maloof, M., "Dynamic Weighted Majority: A New Ensemble Method for Tracking Concept Drift", In Proceedings of the Third International IEEE Conference on Data Mining, Melbourne, FL, US, Nov. 22, 2003, pp. 2-3.

Kolter, J.Z. and Maloof, M., "Learning to Detect Malicious Executables in the Wild", In Proceedings of the 10th International Conference on Knowledge Discovery and Data Mining (KDD '04), Seattle, WA, US, Aug. 22-25, 2004, pp. 470-480.

Korba, J., "Windows NT Attacks for the Evaluation of Intrusion Detection Systems", Thesis, Massachusetts Institute of Technology, Jun. 2000, pp. 1-102.

Kremer, H.S., excerpts from "Real-Time Intrusion Detection for Windows NT Based on Navy IT-21 Audit Policy", Thesis, Naval Post Graduate School, Monterey, CA, US, Sep. 1999, pp. 1-61.

Kruegel, C. et al., "Polymorphic Worm Detection Using Structural Information of Executables", In Proceedings of the 8th International Symposium on Recent Advances in Intrusion Detection, Seattle, WA, US, Sep. 7-9, 2005, pp. 207-226.

Krugel, C. et al., "Service Specific Anomaly Detection for Network Intrusion Detection", In Proceedings of the 2002 Association for Computing Machinery Symposium on Applied Computing, Madrid, ES, Mar. 10-14, 2002, pp. 201-208.

Lane, T. and Brodley, C.E., "Approaches to Online Learning and Concept Drift for User Identification in Computer Security", In AAAI Technical Report WS-98-07, Jul. 1998, pp. 1-5.

(56) References Cited

OTHER PUBLICATIONS

Lane, T. and Brodley, C.E., "Temporal Sequence Learning and Data Reduction for Anomaly Detection", In ACM Transactions on Information and System Security, vol. 2, No. 3, Aug. 1999, pp. 295-331.
LaPadula, L.J., "State of the Art in Anomaly Detection and Reaction", Technical Paper, The MITRE Corporation, Jul. 1999, pp. 1-37.
Larochelle, D. and Evans, D., "Statically Detecting Likely Buffer Overflow Vulnerabilites", In Proceedings of the 10th USENIX Security Symposium (SSYM '01), Washington, DC, US, Aug. 13-17, 2001, pp. 177-190.
Larson, E. et al., "High Coverage Detection of Input-Related Security Faults", In Proceedings of the 12th Conference on USENIX Security Symposium, Washington, DC, US, Aug. 4-8, 2003, pp. 121-136.
Laureano, M. et al., "Intrusion Detection in Virtual Machine Environments", In Proceedings of the 30th Euromicro Conference, Rennes, FR, Aug. 31-Sep. 4, 2004, pp. 1-6.
Lee, J.S. et al., "A Generic Virus Detection Agent on the Internet", In Proceedings of the 30th Annual Hawaii International Conference on System Sciences (HICSS '97), Wailea, HI, US, Jan. 7-10, 1997, pp. 210-219.
Lee, W. and Stolfo, S.J., "Data Mining Approaches for Intrusion Detection", In Proceedings of the 7th Conference on USENIX Security Symposium (SSYM '98), San Antonio, TX, US, Jan. 26-29, 1998, pp. 1-16.
Lee, W. et al., "A Data Mining Framework for Building Intrusion Detection Models", In Proceedings of the 1999 IEEE Symposium on Security and Privacy (S&P '99), Oakland, CA, US, May 9-12, 1999, pp. 120-132.
Lee, W. et al., "A Framework for Constructing Features and Models for Intrusion Detection Systems", In Assosciation of Computing Machinery Transactions on Information and System Security, vol. 3, No. 4, Nov. 2000, pp. 227-261.
Lee, W. et al., "Learning Patterns from Unix Process Execution Traces for Intrusion Detection", In Proceedings of the Association for the Advancement of Artificial Intelligence Workshop: AI Approaches to Fraud Detection, Providence, RI, US, Jul. 27, 1997, pp. 50-56.
Lee, W. et al., "Mining in a Data-Flow Environment: Experience in Network Intrusion Detection", In Proceedings of the Knowledge Discovery and Data Mining International Conference on Knowledge Discovery and Data Mining, San Diego, CA, US, Aug. 15-18, 1999, pp. 114-124.
Lee, W. et al., excerpts from "A Data Mining Approach for Building Cost-Sensitive and Light Intrusion Detection Models", In DARPA Quarterly Review, Nov. 2000, pp. 38-52.
Lee, W., "A Data Mining Framework for Constructing Features and Models for Intrusion Detection Systems", PhD Thesis, Columbia University, Jun. 1999, pp. 1-177.
Lee, W., "Real Time Data Mining-based Intrusion Detection", In DARPA Information Survivability Conference and Exposition II (DISCEX '01), Anaheim, CA, US, Jun. 12-14, 2001, pp. 89-100.
Lhee, K. and Chapin, S.J., "Type-Assisted Dynamic Buffer Overflow Detection", In Proceedings of the 11th USENIX Security Symposium (SSYM '02), San Francisco, CA, US, Aug. 5-9, 2002, pp. 81-90.
Liang, Z. et al., "Automatic Generation of Buffer Overflow Attack Signatures: An Approach Based on Program Behavior Models", In Proceedings of the 21st Annual Computer Security Applications Conference, Tucson, AZ, US, Dec. 5-9, 2005, pp. 215-224.
Liang, Z., "Isolated Program Execution: An Application Transparent Approach for Executing Untrusted Programs", In Proceedings of the 19th Annual Computer Security Applications Conference, Las Vegas, NV, US, Dec. 8-12, 2003, pp. 182-191.
Lin, M.J. et al., "A New Model for Availability in the Face of Self-Propagating Attacks", In Proceedings of the 1998 Workshop on New Security Paradigms (NSPW '98), Charlottesville, VA, US, Sep. 22-25, 1998, pp. 134-137.

Lippmann, R. et al., "The 1999 DARPA Off-Line Intrusion Detection Evaluation", In Computer Networks, vol. 34, No. 4, Oct. 2000, pp. 579-595.
Liston, T. et al., "On the Cutting Edge: Thwarting Virtual Machine Detection", Technical Report, Intelguardians, 2006, pp. 1-27.
Liston, T., "Welcome To My Tarpit: The Tactical and Strategic Use of LaBrea", Polytechnic, Feb. 17, 2003, pp. 1-4, available at: http://download.polytechnic.edu.na/pub4/download.sourceforge.net/pub/sourceforge/I/la/labrea/OldFiles/LaBrea-Tom-Liston-Whitepaper-Welcome-to-my-tarpit.txt.
Locasto, M. et al., "FLIPS: Hybrid Adaptive Intrusion Prevention", In Proceedings of the 8th International Symposium on Recent Advances in Intrusion Detection, Seattle, WA, US, Sep. 7-9, 2005, pp. 82-101.
Locasto, M.E. et al., "Application Communities: Using Monoculture for Dependability", In Proceedings of the 1st Workshop on Hot Topics in System Dependability (HotDep '05), Yokohama, JP, Jun. 30, 2005, pp. 1-5.
MacAfee, "Homepage—macafee.com", Online publication, last accessed Jun. 17, 2016, available at: http://www.mcafee.com.
Mahoney, M. et al., "Detecting Novel Attacks by Identifying Anomalous Network Packet Headers", Technical Report, Florida Institute of Technology, Oct. 2001, pp. 1-10.
Mahoney, M.V. and Chan, P.K., "An Analysis of the 1999 DARPA/Lincoln Laboratory Evaluation Data for Network Anomaly Detection", In Proceedings of the 6th International Symposium Recent Advances in Intrusion Detection, Pittsburgh, PA, US, Sep. 8-10, 2003, pp. 220-237.
Mahoney, M.V. and Chan, P.K., "Learning Nonstationary Models of Normal Network Traffic for Detecting Novel Attacks", In Proceedings of the 8th Knowledge Discovery and Data Mining International Conference on Knowledge Discovery and Data Mining (KDD '02), Edmonton, AB, CA, Jul. 23-26, 2002, pp. 376-385.
Mahoney, M.V., "Network Traffic Anomaly Detection Based on Packet Bytes", In Proceedings of the 2003 ACM Symposium on Applied Computing (SAC '03), Melbourne, FL, US, Mar. 9-12, 2003, pp. 346-350.
Malton, A., "The Denotational Semantics of a Functional Tree-Manipulation Language", In Computer Languages, vol. 19, No. 3, Jul. 1993, pp. 157-168.
Microsoft Corporation, "Microsoft Portable Executable and Common Object File Format Specification", Technical Report, Revision 6.0, Feb. 1999, pp. 1-77.
Microsoft, "Microsoft Outlook 2003", last updated Aug. 9, 2004, pp. 1-3, available at: https://web.archive.org/web/20040829001834/http://office.microsoft.com/en-us/FX010857931033.aspx.
Microsoft, "Structure of the Registry", last accessed Jan. 29, 2016, pp. 1-2, available at: http://msdn.microsoft.com/enus/library/windows/desktop/ms724946(v=vs.85).aspx.
Miller, T. et al., "Strlcpy and Strlcat-Consistent, Safe, String Copy and Concatenation", In Proceedings of the FREENIX Track: 1999 USENIX Annual Technical Conference, Monterey, CA, US, Jun. 6-11, 1999, pp. 131-144.
Miretskiy, Y. et al., "Avfs: An On-Access Anti-Virus File System", In Proceedings of the 13th USENIX Security Symposium, San Diego, CA, US, Aug. 9-13, 2004, pp. 73-88.
Moore, D. et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.
Moore, D. et al., "Internet Quarantine: Requirements for Containing Self-Propagating Code", In IEEE Societies Twenty-Second Annual Joint Conference of the IEEE Computer and Communications, vol. 3, Mar. 30-Apr. 3, 2003, pp. 1901-1910.
Moore, D., "The Spread of the Sapphire/Slammer Worm", last updated Apr. 3, 2003, pp. 1-7, available at: http://www.silicondefense.com/research/worms/slammer.php.
Mori, A., "Detecting Unknown Computer Viruses—A New Approach", In Software Security Theories and Systems, vol. 3233, 2004, pp. 226-241.
Mosberger, D. et al., "httperf—A Tool for Measuring Web Server Performance", In Association for Computing Machinery's Special

(56) References Cited

OTHER PUBLICATIONS

Interest Group on Measurement and Evaluation Performance Evaluation Review, vol. 26, No. 3, Dec. 1998, pp. 31-37.
Mukkamala, S., excerpts from "Intrusion Detection using an Ensemble of Intelligent Paradigms", In the Journal of Network and Computer Applications, vol. 28, No. 2, Apr. 2005, pp. 167-182.
Murray, J.D., "Windows NT Event Logging, Chapter 4: Windows NT Security Auditing", 1st Edition, O'Reilly Media, Sep. 1998, pp. 64-97.
Nachenberg, C., "Behavior Blocking: The Next Step in Anti-Virus Protection", last updated Mar. 19, 2002, pp. 1-7, available at: http://www.symantec.com/connect/articles/behavior-blocking-next-step-anti-virus-protection.
Nachenberg, C., "Computer Virus—Coevolution", In Communications of the Asssociation for Computing Machinery, vol. 40, No. 1, Jan. 1997, pp. 46-51.
Nethercote, N. et al., "Valgrind: A Program Supervision Framework", In Electronic Notes in Theoretical Computer Science, vol. 89, No. 2, Oct. 2003, pp. 44-66.
Newsome, J. and Song, D., "Dynamic Taint Analysis for Automatic Detection, Analysis, and Signature Generation of Exploits on Commodity Software", In Proceedings of the 12th Annual Network and Distributed System Security Symposium (NDSS '05), San Diego, CA, US, Feb. 3-4, 2005, pp. 1-17.
Nojiri, D. et al., "Cooperative Response Strategies for Large Scale Attack Mitigation", In Proceedings of the 3rd Defense Advanced Research Projects Agency Information Survivability Conference and Exposition, Washington, DC, US, Apr. 22-24, 2003, pp. 293-302.
Notice of Allowance dated Feb. 5, 2014 in U.S. Appl. No. 12/297,730.
Notice of Allowance dated Jun. 8, 2015 in U.S. Appl. No. 14/272,187.
NT Security, "Trojan/XTCP", Panda Software's Center for Virus Control, Jun. 22, 2002, pp. 1-3, available at: http://www.ntsecurity.net/Panda/Index.cfm?FuseAction.Virus&VirusID=659.
NW Internet, "Setup Trojan", last updated Mar. 6, 2005, pp. 1, available at: http://www.nwinternet.com/~pchelp/bo/setuptrojan.txt.
Office Action dated Jan. 2, 2014 in U.S. Appl. No. 13/774,825.
Office Action dated Feb. 21, 2013 in U.S. Appl. No. 13/301,741.
Office Action dated Apr. 27, 2015 in U.S. Appl. No. 14/344,458.
Office Action dated Jun. 10, 2015 in U.S. Appl. No. 14/014,871.
Office Action dated Jun. 15, 2012 in U.S. Appl. No. 12/297,730.
Office Action dated Jun. 19, 2014 in U.S. Appl. No. 13/774,825.
Office Action dated Jun. 27, 2012 in U.S. Appl. No. 12/063,733.
Office Action dated Aug. 23, 2010 in U.S. Appl. No. 12/091,150.
Office Action dated Sep. 7, 2012 in U.S. Appl. No. 13/301,741.
Office Action dated Sep. 17, 2010 in U.S. Appl. No. 12/063,733.
Office Action dated Sep. 29, 2014 in U.S. Appl. No. 14/014,871.
Office Action dated Nov. 7, 2011 in U.S. Appl. No. 12/297,730.
Office Action dated Dec. 31, 2015 in U.S. Appl. No. 14/344,458.
Oplinger, J. et al., "Enhancing Software Reliability with Speculative Threads", In Proceedings of the 10th International Conference on Architectural Support for Programming Languages and Operating Systems, San Jose, CA, US, Oct. 5-9, 2002, pp. 184-196.
Paxson, V., "Bro: A System for Detecting Network Intruders in Real-Time", In Proceedings of the 7th USENIX Security Symposium, San Antonio, TX, US, Jan. 26-29, 1998, pp. 1-18.
Peterson, D.S. et al., "A Flexible Containment Mechanism for Executing Untrusted Code", In Proceedings of the 11th USENIX Security Symposium (SSYM '02), San Francisco, CA, US, Aug. 5-9, 2002, pp. 207-225.
Polychronakis, M. et al., "Comprehensive Shellcode Detection Using Runtime Heuristics", In Proceedings of the 26th Annual Computer Security Applications Conference, Austin, TX, US, Dec. 6-10, 2010, pp. 287-296.
Polychronakis, M. et al., "Emulation-Based Detection of Non-Self-Contained Polymorphic Shellcode", In Proceedings of the 10th International Conference on Recent Advances in Intrusion Detection, Gold Coast, AU, Sep. 5-7, 2007, pp. 87-106.
Polychronakis, M. et al., "Network-Level Polymorphic Shellcode Detection Using Emulation", In Proceedings of the Third Conference on Detection of Intrusions and Malware & Vulnerability Assessment, Berlin, DE, Jul. 13-14, 2006, pp. 54-73.
Porras, P.A. and Neumann, P.G., "EMERALD: Event Monitoring Enabling Responses to Anomalous Live Disturbances", In Proceedings of the 20th National Information Systems Security Conference, Baltimore, MD, US, Oct. 7-10, 1997, pp. 353-365.
Prasad, M. et al., "A Binary Rewriting Defense Against Stack Based Buffer Overflow Attacks", In Proceedings of the USENIX Annual Technical Conference, Boston, MA, US, Jun. 9-14, 2003, pp. 211-224.
Prevelakis, V. and Spinellis, D., "Sandboxing Applications", In Proceedings of the USENIX Annual Technical Conference (ATEC '01), Boston, MA, US, Jun. 25-30, 2001, pp. 119-126.
Prevelakis, V., "A Secure Station for Network Monitoring and Control", In Proceedings of the 8th USENIX Security Symposium, Washington, DC, US, Aug. 23-26, 1999, pp. 1-8.
Provos, N. et al., "Preventing Privilege Escalation", In Proceedings of the 12th Conference on USENIX Security Symposium (SSYM'03), Washington, DC, US, Aug. 4-8, 2003, pp. 1-11.
Provos, N., "Improving Host Security with System Call Policies", In Proceedings of the 12th USENIX Security Symposium (SSYM '03), Washington, DC, US, Aug. 4-8, 2003, pp. 257-272.
Quinlan, J.R., "Bagging, Boosting and C4.5", In Proceedings of the Thirteenth National Conference on Artificial Intelligence, Portland, OR, US, Aug. 4-8, 1996, pp. 725-730.
Ramakrishnan, C.R., "Model-Based Vulnerability Analysis of Computer Systems", In Proceedings on the 2nd International Workshop on Verification Model Checking and Abstract Interpretation, Pisa, IT, Sep. 19, 1998, pp. 1-8.
Ratanaworabhan, P. et al., "NOZZLE: A Defense Against Heap-Spraying Code Injection Attacks", In Proceedings of the 18th USENIX Security Symposium, Montreal, CA, Aug. 10-14, 2009, pp. 169-186.
Red Hat, "Configuring OpenSSH", Red Hat Enterprise Linux, accessed Aug. 15, 2014, pp. 1-6, available at: https://access.redhat.com/documentation/en-US/Red_Hat_Enterprise_Linux/7/html/System_Administrators_Guide/s1-ssh-configuration.html.
Reynolds, J. et al., "Online Intrusion Protection by Detecting Attacks with Diversity", In Proceedings of the 16th International Conference on Data and Applications Security, Cambridge, GB, Jul. 28-31, 2002, pp. 245-256.
Reynolds, J. et al., "The Design and Implementation of an Intrusion Tolerant System", In Proceedings of the International Conference on Dependable Systems and Networks, Bethesda, MD, US, Jun. 23-26, 2002, pp. 285-292.
Riley, M. et al., "Missed Alarms and 40 Million Stolen Credit Card Numbers: How Target Blew It", In Bloomberg Businessweek, Mar. 13, 2014, pp. 1-10, available at: http://www.businessweek.com/artides/2014-03-13/target-missedalarms-in-epic-hack-of-credit-card-data.
Rinard, M. et al., "A Dynamic Technique for Eliminating Buffer Overflow Vulnerabilities (and Other Memory Errors)", In Proceedings 20th Annual Computer Security Applications Conference (ACSAC '04), Tucson, AZ, US, Dec. 6-10, 2004, pp. 82-90.
Rinard, M. et al., "Enhancing Server Availability and Security Through Failure-Oblivious Computing", In Proceedings of the 6th Symposium on Operating Systems Design and Implementation, San Francisco, CA, US, Dec. 6-8, 2004, pp. 303-316.
Robichaux, P., "Managing the Windows NT Registry, Chapter 8: Administering the Windows NT Registry" 1st Edition, O'Reilly & Associates, Apr. 1998, pp. 231-272.
Roesch, M., "Snort: Lightweight Intrusion Detection for Networks", In Proceedings of the 13th Conference on Systems Administration, Seattle, WA, US, Nov. 7-12, 1999, pp. 229-238.
Rosenblum, M. et al., "Using the SimOS Machine Simulator to Study Complex Computer Systems", In Association for Computing Machinery Transactions on Modeling and Computer Simulation, vol. 7, No. 1, Jan. 1997, pp. 78-103.

(56) References Cited

OTHER PUBLICATIONS

Rudys, A. and Wallach, D.S., "Transactional Rollback for Language-Based Systems", In Proceedings of the International Conference on Dependable Systems and Networks (DSN '02), Bethesda, MD, US, Jun. 23-26, 2002, pp. 439-448.

Rudys, A. et al., "Termination in Language-Based Systems", In Association for Computing Machinery Transactions on Information and System Security, vol. 5, No. 2, May 2002, pp. 138-168.

Russinovich, M. and Cogswell, B., "Filemon for Windows NT/9x", last updated Aug. 14, 2000, pp. 1-3, available at: https://web.archive.org/web/20000815094424/http://www.sysinternals.com/filemon.htm.

Russinovich, M. and Cogswell, B., "Regmon for Windows NT/9x", last updated Nov. 1, 2006, pp. 1-4. available at: https://web.archive/org/web/20000308184259/http://www.sysinternals.com/ntw2k/source/regmon.shtrn.

Scholkopf, B. et al., "Estimating the Support of a High-Dimensional Distribution", Technical Report, Microsoft Research, Sep. 18, 2000, pp. 1-31.

Schonlau, M. et al., "Computer Intrusion: Detecting Masquerades", In Statistical Science, vol. 16, No. 1, Feb. 2001, pp. 58-74.

Schultz, M. et al., "MEF: Malicious Email Filter—A UNIX Mail Filter that Detects Malicious Windows Executables", In Proceedings of the FREENIX Track: 2001 USENIX Annual Technical Conference, Boston, MA, US, Jun. 25-30, 2001, pp. 245-252.

Schultz, M.G. et al., "Data Mining Methods for Detection of New Malicious Executables", In Proceedings of the IEEE Symposium on Security and Privacy (S&P '01), Oakland, CA, US, May 14-16, 2001, pp. 38-49.

Schwartzbard, A. and Ghosh, a.K., "Study in the Feasibility of Performing Host-based Anomaly Detection on Windows NT", In Proceedings of the 2nd International Workshop on Recent Advances in Intrusion Detection, Sep. 7-9, 1999, West Lafayette, IN, US, pp. 1-10.

Security Space, "Web Server Survey", last updated May 1, 2003, pp. 1, available at: http://www.securityspace.com/s_survey/data/200304/.

Sekar, R. et al. "Specification-Based Anomaly Detection: A New Approach for Detecting Network Intrusions", In Proceedings of the 9th ACM Conference on Computer and Communications Security (CCS '02), Washington, DC, US, Nov. 18-22, 2002, pp. 265-274.

Sekar, R. et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.

Sekar, R. et al., "Model-Carrying Code: A Practical Approach for Safe Execution of Untrusted Applications", In Proceedings of the 19th Asssociation for Computing Machinery Symposium on Operating Systems Principles, Bolton Landing, NY, US, Oct. 19-22, 2003, pp. 15-28.

Seward, J. and Nethercote, N., "Valgrind, An Open-Source Memory Debugger for x86-GNU/Linux", Developer.Kde, May 5, 2003, pp. 1-6, available at http://developer.kde.org/~sewardj/.

Shacham, H. et al., "On the Effectiveness of Address-Space Randomization", In Proceedings of the 11th ACM Conference on Computer and Communications Security (CCS '04), Washington, DC, US, Oct. 25-29, 2004, pp. 298-307.

Shacham, H., "The Geometry of Innocent Flesh on the Bone: Return-into-Libc Without Function Calls (On the x86)", In Proceedings of the 14th Asssociation for Computing Machinery Conference on Computer and Communications Security, Alexandria, VA, US, Oct. 29-Nov. 2, 2007, pp. 552-561.

Shavlik, J. et al., "Evaluating Software Sensors for Actively Profiling Windows 2000 Computer Users", In Proceedings of the 4th International Symposium on Recent Advances in Intrusion Detection (RAID '01), Davis, CA, US, Oct. 10-12, 2001, pp. 1-17.

Shoch, J. et al., "The 'Worm' Programs —Early Experiments with a Distributed Computation", In Communications of the Asssociation for Computing Machinery, vol. 22, No. 3, Mar. 1982, pp. 172-180.

Sidiroglou, S. and Keromytis, A.D., "A Network Worm Vaccine Architecture", In Proceedings of the Twelfth IEEE International Workshops on Enabling Technologies: Infrastructure for Collaborative Enterprises (WETICE '03), Workshop on Enterprise Security, Linz, AT, Jun. 9-11, 2003, pp. 220-225.

Sidiroglou, S. et al., "Building a Reactive Immune System for Software Services", In Proceedings of the 2005 USENIX Annual Technical Conference (USENIX '05), Anaheim, CA, US, Apr. 10-15, 2005, pp. 149-161.

Sidiroglou, S., "Using Execution Transactions to Recover from Buffer Overflow Attacks", Technical Report, 2004, pp. 1-16.

Smaha, S.E., "Haystack: An Intrusion Detection System", In the Fourth Aerospace Computer Security Applications Conference (IEEE Cat. No. CH2619-5 '88) , Orlando, FL, US, Dec. 12-16, 1988, pp. 37-44.

Smirnov, A. and Chiueh, T., "DIRA: Automatic Detection, Identification, and Repair of Control-Hijacking Attacks", In Proceedings of the 12th Symposium on Network and Distributed System Security (NDSS '05), San Diego, CA, US, Feb. 3-4, 2005, pp. 1-17.

Snow, K. et al., "ShellOS: Enabling Fast Detection and Forensic Analysis of Code Injection Attacks", In Proceedings of the 20th USENIX Security Symposium, San Francisco, CA, US, Aug. 8-12, 2011, pp. 1-16.

Solar Designer, "Getting Around Non-Executable Stack (and Fix)", last updated Aug. 10, 1997, pp. 1-7, available at: http://seclists.org/bugtraq/1997/Aug/63.

Sole, P., "Hanging on a ROPe", last updated Sep. 20, 2010, pp. 1-41, available at: http://www.immunitysec.com/downloads/DEPLIB20_ekoparty.pdf.

Somayaji, A. et al., "Principles of a Computer Immune System", In Proceedings of the New Security Paradigms Workshop, Langdale, UK, Sep. 23-26, 1997, pp. 75-82.

Somayaji, A.B., "Operating System Stability and Security through Process Homeostasis", Dissertation, Massachusetts Institute of Technology, Jul. 2002, pp. 1-198.

Song, D. et al., "A Snapshot of Global Internet Worm Activity", Technical Report, Arbor Networks, Nov. 2001, pp. 1-8.

Soni, S., "Understanding Linux Configuration Files", Technical Report, IBM developerWorks, Dec. 1, 2001, pp. 1-11, available at: http://www.ibm.com/developerworks/library/1-config/.

Sourceware, "Summary of GDB", last accessed Aug. 28, 2014, pp. 1, available at: https://sourceware.org/gdb/current/onlinedocs/gdb/Summary.html#Summary.

Spafford, E., "The Internet Worm Program: An Analysis", Technical Report, CSD-TR-823, Purdue University, Dec. 8, 1988, pp. 1-40.

Spinellis, D., "Reliable Identification of Bounded-Length Viruses is NP-Complete", In IEEE Transactions on Information Theory, vol. 49, No. 1, Jan. 2003, pp. 280-284.

Stamp, M., "Risks of Monoculture", In Communications of the Asssociation for Computing Machinery, vol. 47, No. 3, Mar. 2004, pp. 120.

Staniford, S. et al., "How to Own the Internet in Your Spare Time", In Proceedings of the 11th USENIX Security Symposium, San Francisco, CA, US, Aug. 5-9, 2002, pp. 149-167.

Stolfo, S. et al., "Detecting Viral Propagations Using Email Behavior Profiles", Technical Report, Columbia University, 2003, pp. 1-47.

Street, W.N., "A Streaming Ensemble Algorithm (SEA) for Large-Scale Classification", In Proceedings of the Seventh ACM SIGKDD International Conference on Knowledge Discovery and Data Mining, San Francisco, CA, US, Aug. 26-29, 2001, pp. 377-382.

Sugerman, J. et al., "Virtualizing I/O Devices on VMware Workstation's Hosted Virtual Machine Monitor", In Proceedings of the 2001 USENIX Annual Technical Conference, Boston, MA, US, Jun. 25-30, 2001, pp. 1-14.

Suh, G.E. et al., "Secure Program Execution via Dynamic Information Flow Tracking", In Proceedings of the 11th International Conference on Architectural Support for Programming Languages and Operating Systems (ASPLOS '04) Boston, MA, US, Oct. 7-13, 2004, pp. 85-96.

Sun, "SunSHIELD Basic Security Module Guide", Sun Microsystems, Inc., 1995, pp. 1-196.

(56) References Cited

OTHER PUBLICATIONS

Sun, "SunSHIELD Basic Security Module Guide", Sun Microsystems, Inc., 2000, pp. 1-239.

Supplementary European Search Report dated Apr. 16, 2015 in European Patent Application No. 12832510.7.

Symantec, "Happy99.Worm", Symantec.com, last updated Feb. 13, 2007, pp. 1-9, available at: http://www.symantec.com/qvcenter/venc/data/happy99.worm.html.

Symantec, "The Digital Immune System: Enterprise-Grade Anti-Virus Automation in the 21st Century", Technical Brief, Symantec, 2001, pp. 1-16.

Szor, P., "The Art of Computer Virus Research and Defense", Addison-Wesley Professional, Feb. 13, 2005, pp. 1-617.

Tandon, G., "Learning Rules From System Call Arguments and Sequences for Anomaly Detection", In Proceedings of ICDM Workshop on Data Mining for Computer Security (DMSEC '03), Melbourne, FL, US, Nov. 19, 2003, pp. 20-29.

Taylor, C. and Alves-Foss, J., "NATE-Network Analysis of Anomalous Traffic Events, A Low-Cost Approach", In New Security Paradigms Workshop (NSPW '01), Cloudcroft, NM, US, Sep. 10-13, 2002, pp. 89-96.

Techhit, "EZdetach", last updated Jun. 3, 2004, pp: 1-2, available at https://web.archive.org/web/20040603143652/http://techhit.com/ezdetatch.

Teng, H.S. et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.

Toth, T. and Kruegel, C., "Connection-History Based Anomaly Detection", In Proceedings of the 2002 IEEE Workshop on Information Assurance and Security (IAS '02), West Point, NY, US, Jun. 17-19, 2002, pp. 30-35.

Toth, T. et al., "Accurate Buffer Overflow Detection via Abstract Payload Execution", In Proceedings of the 5th Symposium on Recent Advances in Intrusion Detection, Zurich, CH, Oct. 16-18, 2002, pp. 274-291.

Toyoizumi, H. et al., "Predators: Good Will Mobile Codes Combat Against Computer Viruses", In Proceedings of the 2002 Workshop on New Security Paradigms, Virginia Beach, VA, US, Sep. 23-26, 2002, pp. 11-17.

Tripwire, "Tripwire Intrusion Detection System 1.3 for LINUX User Manual", Jul. 27, 1998, pp. 1-46.

Tripwire, Inc. "Tripwire 2.4 Reference Guide", 2001, pp. 1-140.

Tripwire, Inc. "Tripwire for Servers 2.4 User Guide", 2001, pp. 1-118.

Tsymbal, A., "The Problem of Concept Drift: Definitions and Related Work", Technical Report TCD-CS-2004-15, Department of Computer Science, Trinity College Dublin, IE, Apr. 2004, pp. 1-7.

Twycross, T. et al., "Implementing and Testing a Virus Throttle", In Proceedings of the 12th USENIX Security Symposium, Washington, DC, US, Aug. 4-8, 2003, pp. 285-294.

Tzermias, Z. et al, "Combining Static and Dynamic Analysis for the Detection of Malicious Documents", In Proceedings of the Fourth European Workshop on System Security, Salzburg, AT, Apr. 2011, pp. 1-6.

U.S. Appl. No. 10/352,342, filed Jan. 27, 2003.
U.S. Appl. No. 12/091,150, filed Apr. 22, 2008.
U.S. Appl. No. 12/297,730, filed Dec. 4, 2009.
U.S. Appl. No. 13/301,741, filed Nov. 21, 2011.
U.S. Appl. No. 60/308,623, filed Jul. 30, 2001.
U.S. Appl. No. 60/351,857, filed Jan. 25, 2002.
U.S. Appl. No. 60/730,289, filed Oct. 25, 2005.
U.S. Appl. No. 61/535,288, filed Sep. 15, 2011.

Valcare, E.M. et al., excerpts from "ESSENCE: An Experiment in Knowledge-Based Security Monitoring and Control", In USENIX Security Symposium III Proceedings, Baltimore, MD, US, Sep. 1992, pp. 155-169.

Vendicator, "Stack Shield: A 'Stack Smashing' Technique Protection Tool for Linux", Jan. 7, 2000, pp. 1, available at: http://angelfire.com/sk/stackshield.

Vigna, G. and Kemmerer, R.A., "NetSTAT: A Network-Based Intrusion Detection System", In Journal of Computer Security, vol. 7, No. 1, Sep. 1999, pp. 37-71.

Viljanen, L., "A Survey of Application Level Intrusion Detection", Technical Report, University of Helsinki, FI, Dec. 2004, pp. 1-32.

Wang, C. et al., "On Computer Viral Infection and the Effect of Immunization", In Proceedings of the 16th Annual Computer Security Applications Conference, New Orleans, LA, US, Dec. 11-15, 2000, pp. 246-256.

Wang, N. et al., "Y-Branches: When You Come to a Fork in the Road, Take It", In Proceedings of the 12th International Conference on Parallel Architectures and Compilation Techniques (PACT '03), New Orleans, LA, US, Sep. 27-Oct. 1, 2003, pp. 56-66.

Wang, X. et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.

Warrender, C. et al., "Detecting Intrusions Using System Calls: Alternative Data Models", In IEEE Symposium on Security and Privacy (S&P '99), Oakland, CA, US, May 9-12, 1999, pp. 133-145.

Webb, A.R., excerpts from "Statistical Pattern Recognition", Oxford University Press, 1999, pp. 347.

Whitaker, A. et al., "Scale and Performance in the Denali Isolation Kernel", In Proceedings of the Fifth Symposium on Operating Systems Design and Implementation (OSDI '02), Boston, MA, US, Dec. 9-11, 2002, pp. 195-209.

White Phosphorus, "White Phosphorous Exploit Pack", last updated Jul. 2, 2013, pp. 1-10, available at http://www.whitephosphorus.org/.

White, S.R., "Anatomy of a Commercial-Grade Immune System", In Proceedings of the Ninth International Virus Bulletin Conference, Vancouver, BC, CA, Sep. 30, 1999, pp. 1-28.

White, S.R.,"Open Problems in Computer Virus Research", Technical Report, IBM Thomas J. Watson Research Center, Oct. 1998, pp. 1-10, available at: http://www.research.ibm.com/antivirus/SciPapers/White/Problems/Problems.html.

Whittaker, J., "No Clear Answers on Monoculture Issues", In IEEE Security & Privacy, vol. 1, No. 6, Nov. 2003, pp. 18-19.

Wicherski, G., "libscizzle", last updated Aug. 13, 2011, pp. 1, available at: http://code.mwcollectorg/projects/libscizzle.

Wilander, J. et al., "A Comparison of Publicly Available Tools for Dynamic Buffer Overflow Prevention", In Proceedings of the 10th Network and Distributed System Security Symposium, San Diego, CA, US, Feb. 6-7, 2003, pp. 1-14.

Williamson, M., "Throttling Viruses: Restricting Propagation to Defeat Malicious Mobile Code", Technical Report, HP Laboratories Bristol, Dec. 2002, pp. 1-9.

Witten, I.H. and Frank, E., "Data Mining: Practical Machine Learning Tools and Techniques with Java Implementations", (month unknown) 2000, pp. 1-369.

Wong, C., et al., "A Study of Mass-Mailing Worms", In Proceedings of the Asssociation for Computing Machinery Workshop on Rapid Malcode, Washington, DC, US, Oct. 29, 2004, pp. 1-10.

Written Opinion dated May 14, 2008 in International Patent Application No. PCT/US2006/032470.

Written Opinion dated Jun. 25, 2008 in International Patent Application No. PCT/US2006/041591.

Written Opinion dated Jul. 7, 2008 in International Patent Application No. PCT/US2006/015080.

Written Opinion dated Dec. 7, 2012 in International Patent Application No. PCT/US2012/055824.

Xiong, J., "ACT: Attachment Chain Tracing Scheme for Email Virus Detection and Control", In Proceedings of the ACM Workshop on Rapid Malcode, Washington, DC, US, Oct. 29, 2004, pp. 11-22.

Ye, N., "A Markov Chain Model of Temporal Behavior for Anomaly Detection", In Proceedings of the IEEE Workshop on Information Assurance and Security (IAS '00), West Point, NY, US, Jun. 6-7, 2000, pp. 171-174.

Yeung, D.Y. and Ding, Y., "Host-Based Intrusion Detection using Dynamic and Static Behavioral Models", In Pattem Recognition, vol. 36, No. 1, Nov. 22, 2001, pp. 229-243.

Yin, J. et al., "Separating Agreement from Execution for Byzantine Fault Tolerant Services", In Proceedings of the 19th Asssociation

(56) References Cited

OTHER PUBLICATIONS for Computing Machinery Symposium on Operating Systems Principles, Bolton Landing, NY, US, Oct. 19-22, 2003, pp. 253-267.

Younan, Y. et al., "A Methodology for Designing Countermeasures Against Current and Future Code Injection Attacks", In Proceedings of the 3rd IEEE International Workshop on Information Assurance, College Park, MD, US, Mar. 23-24, 2005, pp. 3-20.

Yuan, L. et al., "Security Breaches as PMU Deviation: Detecting and Identifying Security Attacks Using Performance Counters", In Proceedings of the Second Asia-Pacific Workshop on Systems, Jul. 11, 2011, New York, NY, US, pp. 1-5.

Zhang, Q. et al., "Analyzing Network Traffic to Detect Self-Decrypting Exploit Code", In Proceedings of the 2nd Asssociation for Computing Machinery Symposium on Information, Computer and Communications Security, Singapore, Mar. 20-22, 2007, pp. 4-12.

Zhou, P. et al., "AccMon: Automatically Detecting Memory-Related Bugs Via Program Counter-Based Invariants", In Proceedings of the 37th International Symposium on Mircoarchitecture, Portland, OR, US, Dec. 4-8, 2004, pp. 269-280.

Zou, C. et al., "Code Red Worm Propagation Modeling and Analysis", In Proceedings of the 9th ACM Conference on Computer and Communications Security, Washington, DC, US, Nov. 18-22, 2002, pp. 138-147.

Zou, C. et al., "Email Worm Modeling and Defense", In Proceedings of the 3rd International Conference on Computer Communications and Networks, Chicago, IL, US, Oct. 11-13, 2004, pp. 409-414.

Zou, C. et al., "Feedback Email Worm Defense System for Enterprise Networks", Technical Report, University of Massachusetts, Apr. 2004, pp. 1-8.

Zou, C.C. et al., "Monitoring and Early Warning for Internet Worms", In Proceedings of the 10th ACM International Conference on Computer and Communications Security (CCS '03), Washington, DC, US, Oct. 27-30, 2003, pp. 190-199.

Zovi, D., "Practical Return-Oriented Programming", last updated Mar. 17, 2010, pp. 1-41, available at: http://365.rsaconference.com/servlet/JiveServlet/previewBody/2573-102-3-3232/RR-304.pdf.

Zweinenberg, R., excerpts from "Heuristics Scanners: Artificial Intelligence", In Proceedings of Virus Bulletin Conference, Boston, MA, US, Sep. 20-22, 1995, pp. 205-209.

Kruegel et al., "On the Detection of Anomalous System Call Arguments", In Proceedings of the 8th European Symposium on Research in Computer Security, Gjovik, Norway, Oct. 13-15, 2003, pp. 326-343.

Office Action dated Oct. 7, 2016 in U.S. Appl. No. 15/014,784.

\* cited by examiner

SYSTEMS, METHODS, AND MEDIA PROTECTING A DIGITAL DATA PROCESSING DEVICE FROM ATTACK

CROSS-REFERENCE TO RELATED APPLICATION

This application is a continuation of U.S. application Ser. No. 13/774,825, filed on Feb. 22, 2013, which is a continuation of U.S. patent application Ser. No. 12/063,733, filed Nov. 24, 2008, which is the U.S. National Phase Application under 35 U.S.C §371 of International Patent Application No. PCT/US2006/032470, filed Aug. 18, 2006, which claims the benefit of U.S. Provisional Patent Application No. 60/709,170, filed Aug. 18, 2005, each of which is hereby incorporated by reference herein in its entirety.

FIELD OF THE INVENTION

The disclosed subject matter relates to the field of computer security. More particularly, the disclosed subject matter relates to systems and methods for detecting and inhibiting attacks launched by electronic mail (e-mail).

BACKGROUND

E-mail based worms and viruses, sometimes referred to as malware, may infect large numbers of hosts rapidly. E-mail malware can propagate as executable attachments that users are tricked into opening, thus potentially causing the malignant code to run and propagate. One way the propagation can occur, for example, is by the attacking code sending copies of itself to entries in the users' e-mail address books. While e-mail attachments are not the only vector by which malware propagates, they pose a substantial threat that merits special .sup.treatment, especially since attachments can be caught before they hit a user's machine. There are various approaches to defending against malicious software, for example, employing virus scanners to detect viruses.

Virus scanners are largely signature-based and typically identify security threats by scanning files for certain byte sequences that match already-known patterns of malicious code. Therefore, the scanners require an up-to-date signature database to be maintained. Maintaining such a database can be a difficult and resource-intensive problem. This problem can be exacerbated by the lag in the cycle of detecting a new attack and the deployment of a corresponding signature, especially when humans are involved in the process. Further complicating the situation is that many e-mail born viruses do not rely on software bugs. instead, they rely on humans to click on the attachments, thus activating them. Thus, the need for frequent updates and the inherent delay between the creation of malicious software, and the detection and deployment of signatures or patches relegate signature-based techniques to a secondary role in the active security of systems.

Another approach, the use of behavior-based mechanisms, characterizes software based on the perceived effects that the software has on an examined system instead of relying on distinct signatures of that: software. A benefit of this approach is that it can detect previously unseen attacks, that is, attacks for which the system has no prior knowledge or signatures. These attacks can be detected as long as there is some differentiation between the behavior of the attacking software and that of normal software. Many of these behavior-based systems rely on anomaly detection algorithms for their classification, and thus detection, of malignant code.

Anomaly-detection algorithms work by constructing models of normal behavior and subsequently checking observed behavior against these models for statistically significant variations that may hint at malicious behavior. The success of an anomaly detection algorithm can depend on the choice of an accurate behavior model. Host-based intrusion detection systems typically employ anomaly detection algorithms that are based on network activity, system call, and file system monitoring.

One negative aspect of host-based intrusion detection systems (IDS) is that the computational overhead associated with extracting behavior models from irregular and high-volume events may tax the processing power of the host. For example, analyzing all system calls in a system may impose considerable overhead due to the volume of events. Correlating this with the generally irregular nature of system calls imposes a considerable computational overhead. False positive rates may pose a further disadvantage.

Accordingly, it is desirable to provide systems and methods that overcome these and other deficiencies of prior systems.

SUMMARY

In accordance with some embodiments of the disclosed subject matter, systems, methods, and media for protecting a digital data processing device from attack are provided.

For example, in some embodiments, a method for protecting a digital data processing device from attack is provided, that includes, within a virtual environment: receiving at least one attachment to an electronic mail; and executing the at least one attachment; and based on the execution of the at least one attachment, determining whether anomalous behavior occurs.

As another example, in some embodiments, a system for protecting a digital data processing device from attack is provided, that includes at least one processor that: provides a virtual environment that: receives at least one attachment to an electronic mail; and executes the at least one attachment; and lased on the execution of the at least one attachment, determines whether anomalous behavior occurs.

In yet another example, in some embodiments, a computer-readable medium containing computer-executable instructions that, when executed by a computer, cause the computer to perform a method for protecting a digital data processing device from attack is provided, that includes within a virtual environment; receiving at least one attachment to an electronic mail: and executing the at least one attachment; and based on the execution of the at least one attachment, determining whether anomalous behavior occurs.

BRIEF DESCRIPTION OF THE DRAWINGS

The above and other advantages of the disclosed subject matter will be apparent upon consideration of the following detailed description, taken in conjunction with accompanying drawings, in which.

DETAILED DESCRIPTION

Systems, methods, and media for protecting a digital data processing device from attack are provided in some embodiments of the disclosed subject matter. The ability of a host-based IDS to detect previously unseen malware and the ability of a mail-server based filtering solution can also be provided in various embodiments. For example, as further described herein, in some of such embodiments, incoming e-mail messages can be scanned at a mail server for potentially dangerous attachments such as, for example, worms or viruses. Such attachments can be sent to one of a set of protected environments running various mail user agents (MUA) and a host-based IDS. A mail reader, which can be part of an MUA, can open and execute e-mail attachments and the IDS can observe the resulting behavior. If the IDS detects suspicious behavior, it can notify the mail server. The mail server can then decide to discard the corresponding e-mail message. The system can be run in a virtual environment, such as a virtual machine (VM), so that clean-up does not need to be performed. Instead, the virtual environment can be discarded and a new one spawned for each new check.

It should be noted that adding computer power (e.g., faster or more machines) to the checking components of some embodiments of the disclosed subject matter can allow customization of the resources needed for defense. Various environments running various MIAs can be set up and selected, for example, based on the local user population. Traditional techniques such as pattern-matching or signature-based techniques to catch known viruses can also be incorporated with various embodiments of the disclosed subject matter. It should also be noted that a large number of malware-checking VMs can be operated in parallel to cope with high loads.

Figure 1:
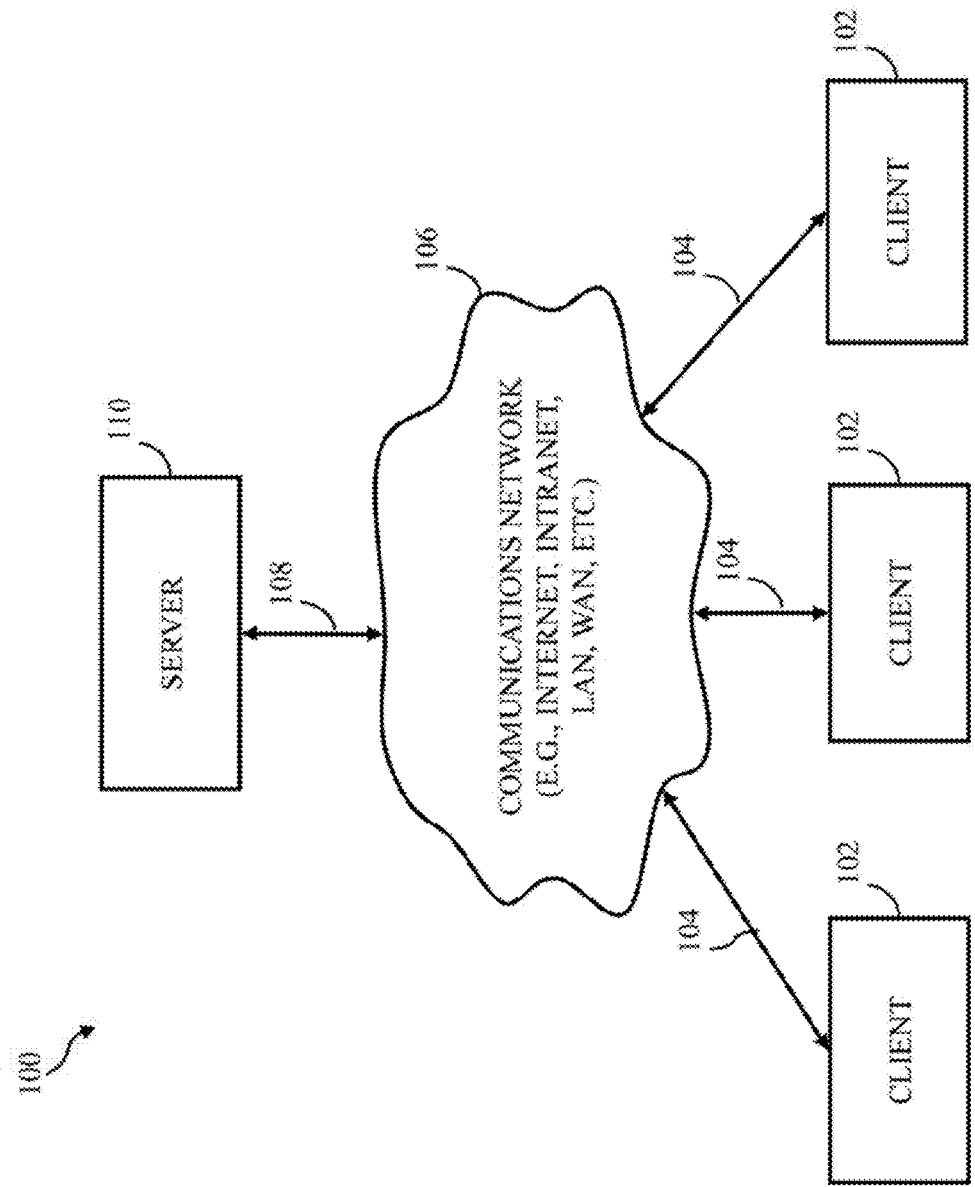
FIG. 1 is a schematic diagram of an illustrative system suitable for implementation of an application that monitors traffic and protects applications from attacks in accordance with some embodiments of the disclosed subject matter.

FIG. 1 is a schematic diagram of an illustrative system 100 for protecting an application front attack launched through e-mail in accordance with some embodiments of the disclosed subject matter. As illustrated, system 100 can include one or more clients 102. Clients 102 can be local to each other or remote from each other, and can be connected by one or more communications links 104 to a communications network 106. Communications network 106 can also be linked via a communications link 108 to a server 110. Various embodiments of the present application can be implemented on at least one of the server and the clients. It is also possible that a client and a server can he connected via communication links 108 or 104 directly and not through a communication network 106.

In system 100, server 110 can be any suitable digital processing device for executing an application, such as, for example, a server, a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 can be any communications links suitable for communicating data between clients 102 and server 110, such as network links, dial-up links, wireless links, hard-wired links, etc. Clients 102 can be any suitable digital processing devices, such as, for example, personal computers, laptop computers, mainframe computers, dumb terminals, data displays, Internet browsers, personal digital assistants (PDAs), two-way pagers, wireless terminals, portable telephones, etc., or any combination of the same. Clients 102 and server 110 can be located at any suitable location. in one embodiment, clients 102 and server 110 can be located within an organization. Alternatively, clients 102 and server 110 can be distributed between multiple organizations.

Figure 2:
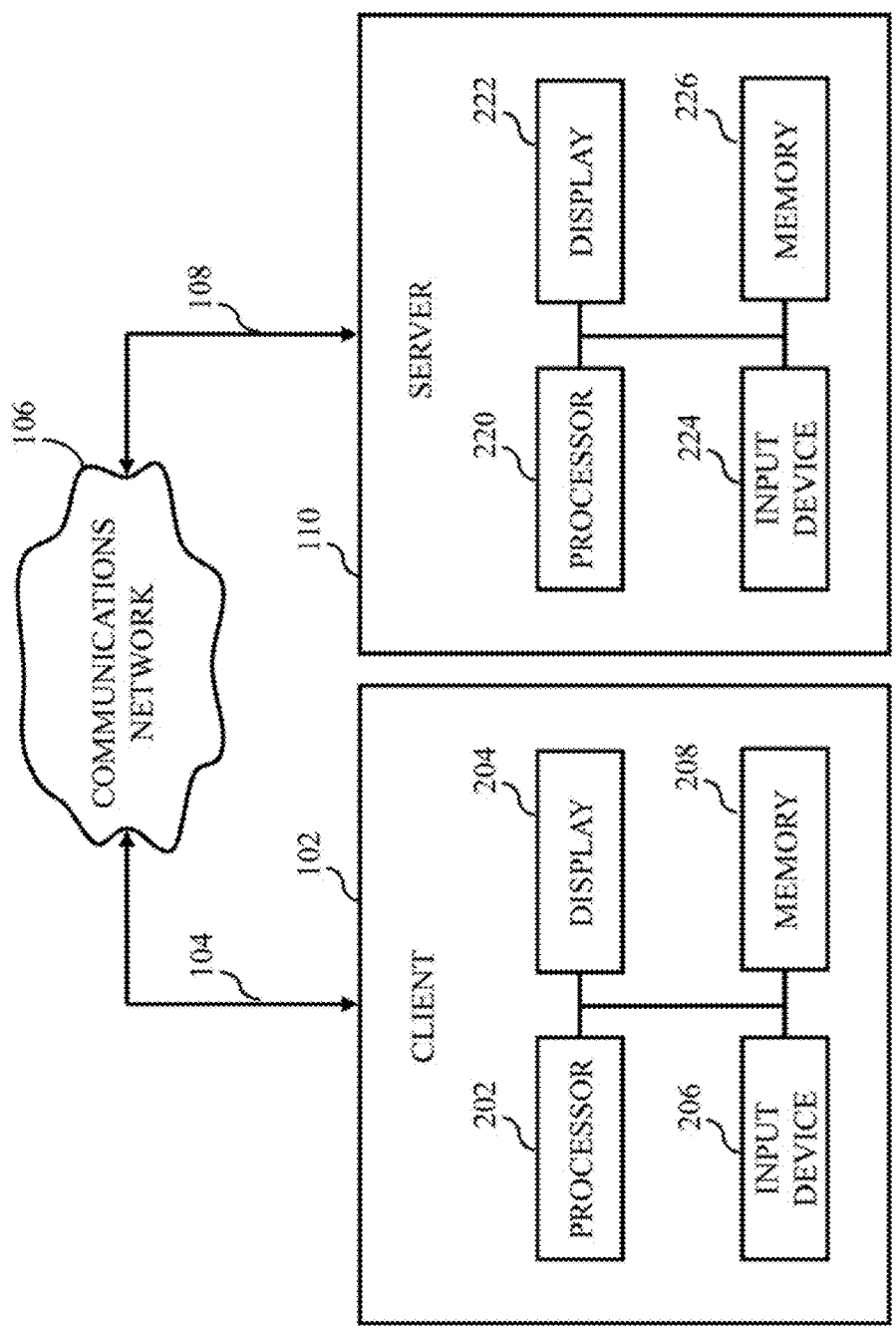
FIG. 2 is a detailed example of the server and one of the clients of FIG. 1 that can be used in accordance with some embodiments of the disclosed subject matter.

The server and one of the clients, which are depicted in FIG. 1, are illustrated in more detail in FIG. 2. Referring to FIG. 2, client 102 and server 100 can include respectively, for example, among other things, processors 202 and 220, displays 204 and 222, input devices 206 and 224, and memory 208 and 226, which can be interconnected. In some embodiments, memory 208 and 226 can contain a storage device for storing a program for controlling processors 202 and 220. Memory 208 and 226 can also contain applications for protecting at least one other application front attacks. In sonic embodiments, various applications can be resident in the memory of client 102 or server 110. It should be noted that variations and combinations of system 100 might be suitable for different embodiments of the disclosed subject matter.

Although the disclosed subject matter can he described as being implemented on a client and/or a server, this is only illustrative. Various components of embodiments of the disclosed subject matter can be implemented on any suitable platform (e.g., a personal computer (PC), a mainframe computer, a two-way pager, a wireless terminal, a portable telephone, a portable computer, a palmtop computer, a Handheld PC, an automobile PC, a laptop computer, a personal digital assistant (PDA), a combined cellular phone and PDA, etc.) to provide such features. Such platform can include, for example, among other things, a processor, a display, an input device, and memory as described above for the client and the server illustrated in FIG. 2.

Figure 3:
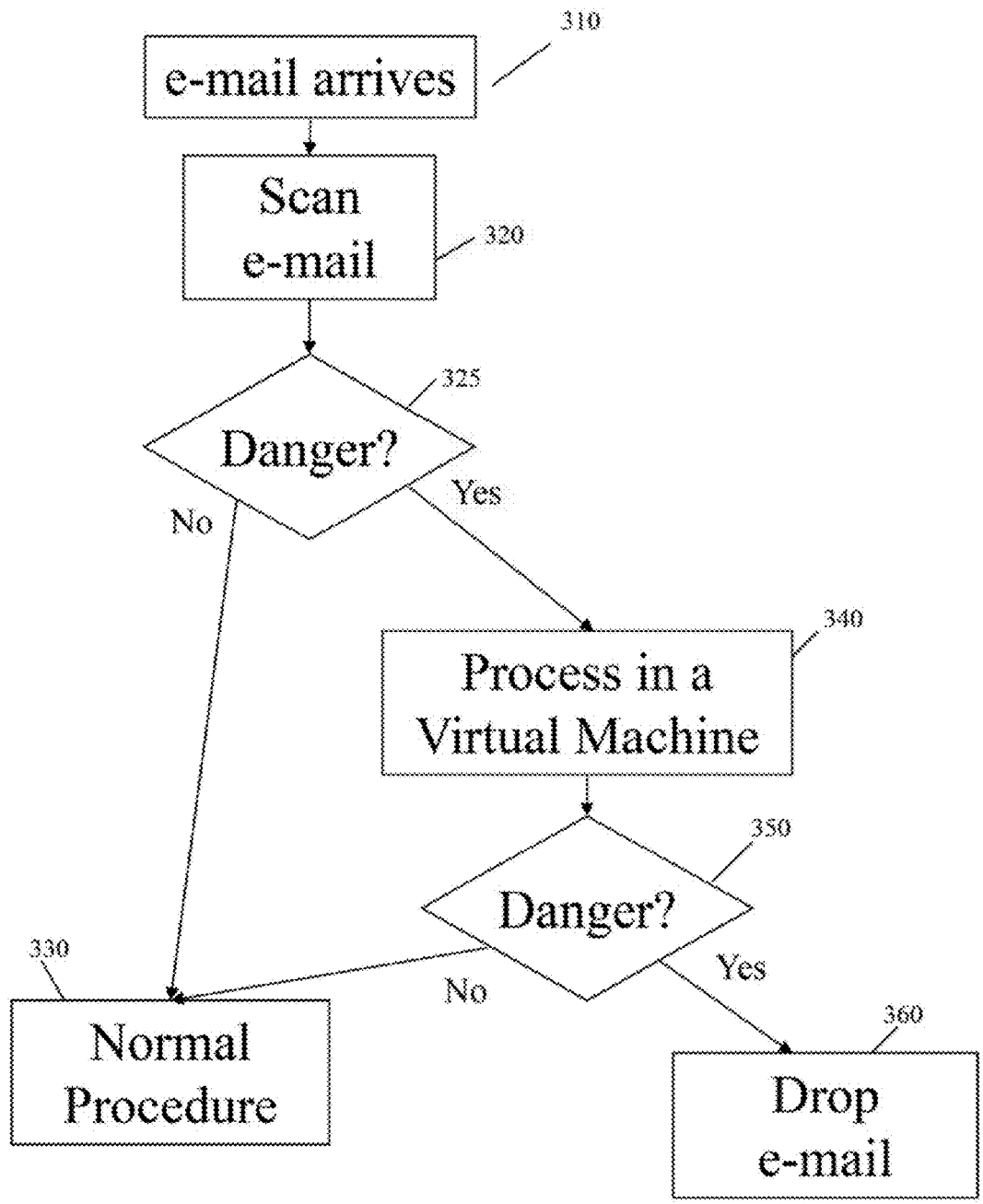
FIG. 3 is a simplified illustration of an embodiment of a method for protecting an application from attacks in accordance with the disclosed subject matter.

FIG. 3 illustrates an embodiment of a method for protecting a computer from attacks according to the disclosed subject matter. An e-mail is received, at 310, from a network, such as, for example, the Internet. The e-mail can be scanned, at 320, for potentially dangerous attachments such as, for example, worms, viruses, and/or Trojan Horses. If none are detected, at 325, the e-mail can proceed normally, at 310, by, for example, being sent on to its intended recipient. However, if a possibly dangerous attachment is detected, at 325, the attachment and/or the e-mail can be forwarded to a protected environment that can perform further analysis, at 340, to determine possible danger. This analysis, which is described in further detail below, can include, for example, opening each attachment, clicking on any hyperlinks, etc., and watching for suspicious behavior. It should be noted that the opening of the attachment can include executing the attachment and can include the use of software associated with the attachment, called by the attachment, or needed to open the attachment. If no danger is detected at 350, the e-mail can be handled normally, at 330, by, for example, being sent to its intended recipient. If danger is detected at 350, such as the detection of a virus, the e-mail can be treated specially, for example, it can be dropped or quarantined, at 360, and therefore not forwarded to its intended recipient. The use of additional methods, such as pattern-matching or signature based techniques can also be incorporated.

Figure 4:
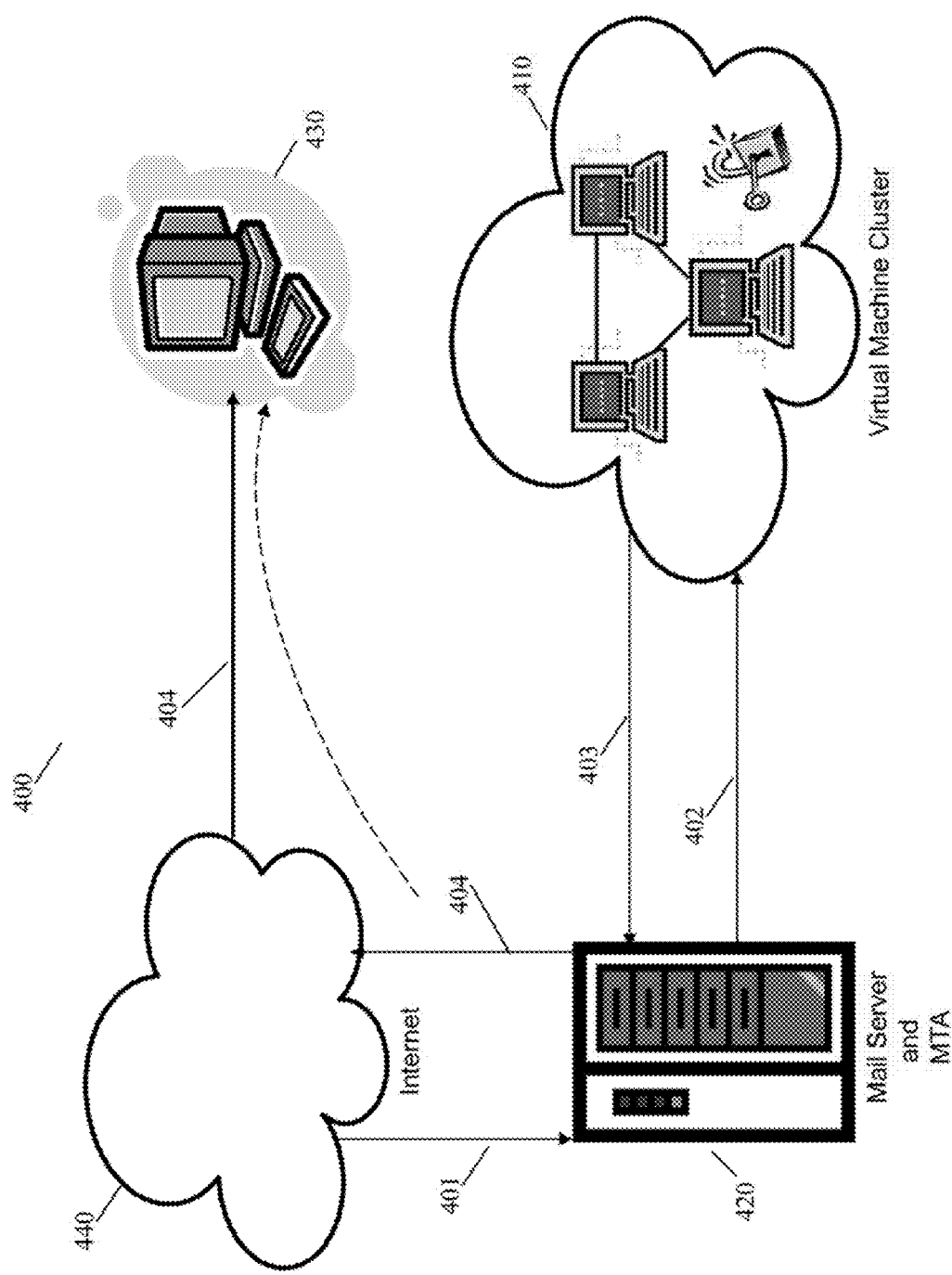
FIG. 4 is a simplified illustration of a system for monitoring electronic mail and protecting applications from attacks in accordance with some embodiments of the disclosed subject matter.

FIG. 4 illustrates a system 400 for implementing the disclosed subject matter. As shown, system 400 includes, among other things, a virtual machine cluster 410, a mail server 420, a user system 430, and the Internet 440. The virtual machine cluster 410 houses protected environments that can run instances of different MUAs and operating systems. A host-based IDS that detects anomalous behavior can also be located in the virtual machine cluster 410. However, the IDS can be run either inside a virtual environment on the cluster 410 or outside a virtual environment. A Mail Transport Agent (MTA) that classifies and manages potentially malicious e-mail messages can be run on Mail Server 420. System 400 can be implemented, for example, in system 100. A server 110 can be used as mail server 420. A client 102 can be used as a user system 430. Additional clients 102 can be used to embody virtual machine cluster 410. Of course, this is just one of various possible configurations for embodiments of the disclosed subject matter. For example, it is also possible that a number of servers 110 can be used to embody virtual machine cluster 410.

System 400 can be used to protect a computer from attack. For example, an e-mail can arrive, at 401, at server 420. The server can decide, based on, for example, if the e-mail contains any attachments, to transmit, at 402, the e-mail and any attachments to virtual machine cluster 410. The virtual machine cluster 410 can provide an indication, at 403, of whether an attack or malicious code is detected. The server 420 can decide, based in part on the indication 403, to transmit the message, at 404, to a client 430.

A host-based Intrusion Detection System (IDS) can run a potentially malicious application on a host machine. In order to be able to detect zero-day e-mail worms, a non signature-based approach can be used. For this purpose, a behavior-based mechanism, such as an IDS, can be used as the anomaly detection component of system 400.

Allowing an attack to run locally can render that particular machine useless for further use. For this reason, it is of benefit to test the potentially malicious software in an isolated and controlled environment that provides the required level of protection. A good candidate for this is a virtual machine environment that can be effectively flushed after each use without further impact to the underlying system. The virtual machine cluster 410 can be such an environment. As described above, virtual machine cluster 410 can house protected environments that run instances of different Mail User Agents (MUAs) and operating systems. Virtual machine images that contain a base system used across the virtual cluster can be used. These virtual machine images have the advantage of providing a test case that is identical (or similar) to the system of the intended recipient of the e-mail. An additional benefit of using a centralized virtual machine based architecture is that the need to deploy IDS and mail filtering software on large numbers of desktops can be avoided.

The Mail Transfer Agent (MTA), on server 420, in accordance with certain embodiments of the disclosed subject matter, can classify and filter potentially malicious e-mail, communicate with the host-based intrusion detection systems in virtual machine cluster 410, and maintain a queue of e-mails. The MTA 420 can act as a first line of defense and impose message classification and filtering. A learning component that can be included in system 400 and coupled to MTA 420 can facilitate the decision process by receiving feedback from the host-based IDS. The filtering component of the MTA can conceptually reside in front of the classification component. Filtering can be used, for example, to avoid denial-of-service attacks on the underlying system. in the case of a mass e-mail worm outbreak, for example, once the IDS determines that an e-mail contains a malicious payload and informs the MTA of this, subsequent e-mail containing identical payloads can be sent directly to the quarantine component, dropped, or otherwise prevented from reaching their target. This becomes more difficult to solve for polymorphic and metamorphic e-mail worms. In the presence of for example, a high-volume polymorphic outbreak, some embodiments of the disclosed subject matter can alter all incoming e-mail that fits high-level characteristics, such as, for example, e-mail having an attachment or originating from a particular source. The e-mail can be pushed directly to a quarantine or replied to with a message, such as a "451 transient error, try again later" message.

Additionally, classification of messages can be performed on the basis of a set of heuristics such as the presence of attachments or embedded URLs. Once a message has been classified as suspicious, it can be sent to a host-based IDS in VM cluster 410. Messages arriving at a cluster 410 can be placed in temporary queues to wait for a decision from the LOS.

The mail user agents (MUA), located on virtual machine cluster 410, can retrieve and execute potentially malicious e-mail. An MUA can simulate the behavior of a naive user by opening e-mail attachments and, for example, "clicking" on URLs. Using an MUA in this way, instead of simply downloading an e-mail or attachment directly, allows vulnerabilities to be exposed that are related to the use of that particular MUA.

Figure 5:
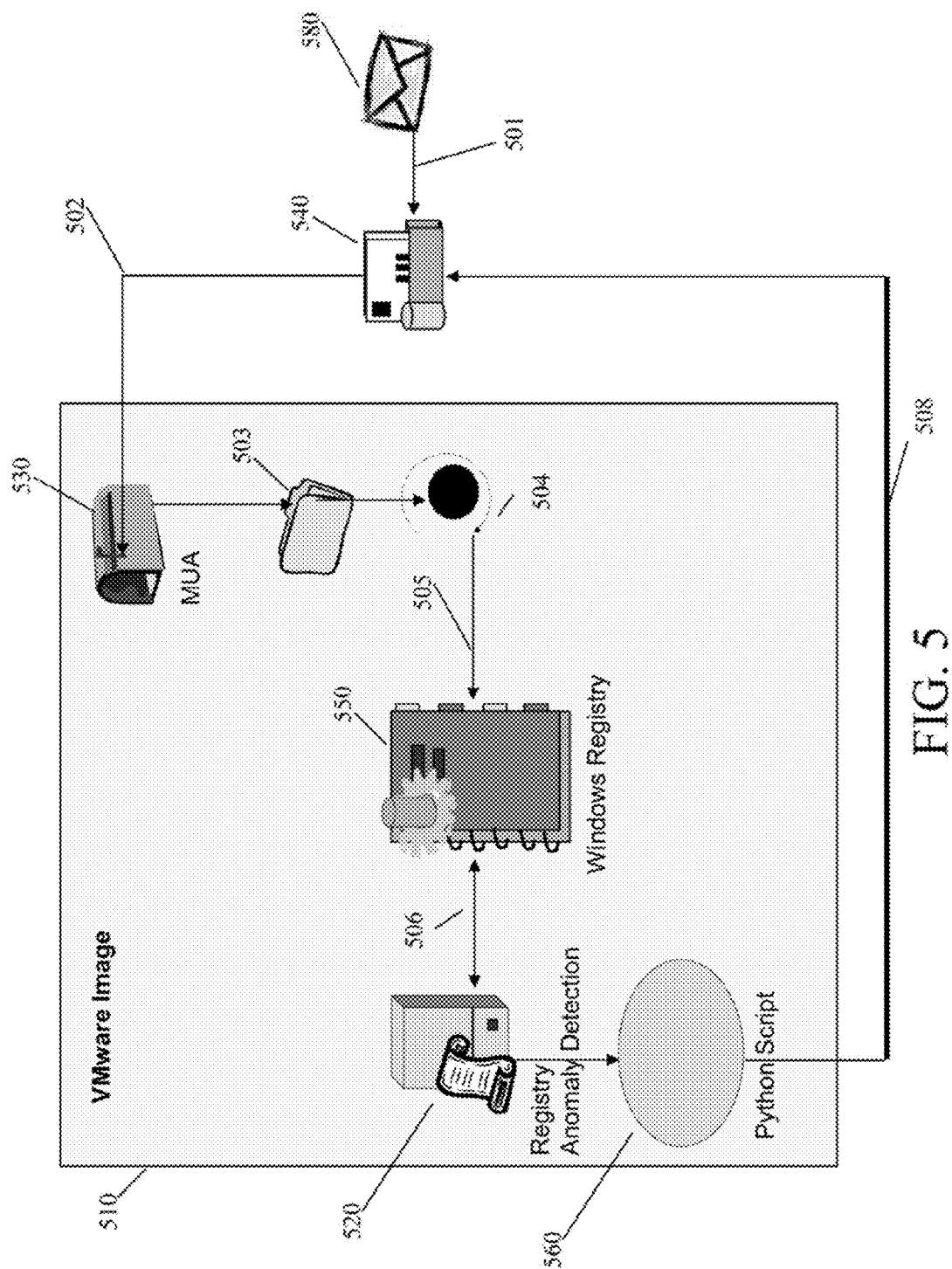
FIG. 5 is a simplified illustration of a process for monitoring electronic mail and protecting applications from attacks in accordance with some embodiments of the disclosed subject matter.

An illustrative embodiment of a virtual environment and an MTA is illustrated in FIG. 5. in this embodiment, virtual environment 510 is implemented using VMware, available from VMware, Inc. of Palo Alto Calif. Virtual environments 510 can be used to form a virtual machine cluster 410. Inside each virtual environment 510, an intrusion detection system and a mail user agent (MUA) 530 can be implemented. Registry Anomaly Detection (RAD) system 520 can be used as the intrusion detection system, and Microsoft Outlook 530, available from Microsoft Corporation of Redmond, Wash., can be used as the mail user agent (MUA) in certain embodiments mail transfer agent (MTA) 540 can be implemented using Postfix, available from postfix.org, and can be run, for example, on server 420 of FIG. 4. The MUA, as discussed above, is software that an e-mail user usually interacts with when dealing with e-mail. In the embodiment illustrated in FIG. 5, the MUA 530 is responsible for simulating the behavior of a naive user by, for example, opening every attachment and "clicking" on every link. Any appropriate MUA can be used, such as, for example, Microsoft Outlook. The EZdetach available from TechHit of San Francisco, Calif. can be used along with MUA 530. EZdetach can extract and save Outlook attachments from messages, as well as run custom scripts on these attachments. Script, 560, which, for example, can be implemented using the Python programming language, can wait for an indication from RAD 520 on whether an anomaly or possible attack was detected. Based on this indication, it can provide an indication to MTA 540 as to whether or not an e-mail should be allowed to reach a user.

This and similar configurations can be used to protect a computer from attack. For example, an e-mail 580 can arrive, at 501, at MTA 540. The MTA can transmit, at 502, the e-mail to MUA 530 inside VMWare Image 510. The MUA 530, can open 503 any attachments. As discussed, this opening can include executing, at 504, any attached or referenced software and "clicking" on any hyperlinks. Interactions, at 505, can take place with the Windows Registry 550. RAD 520 can monitor these interactions 505, at 506. An indication, at 508, of whether an attack or malicious code is detected can he provided to MTA 540.

Figure 6:
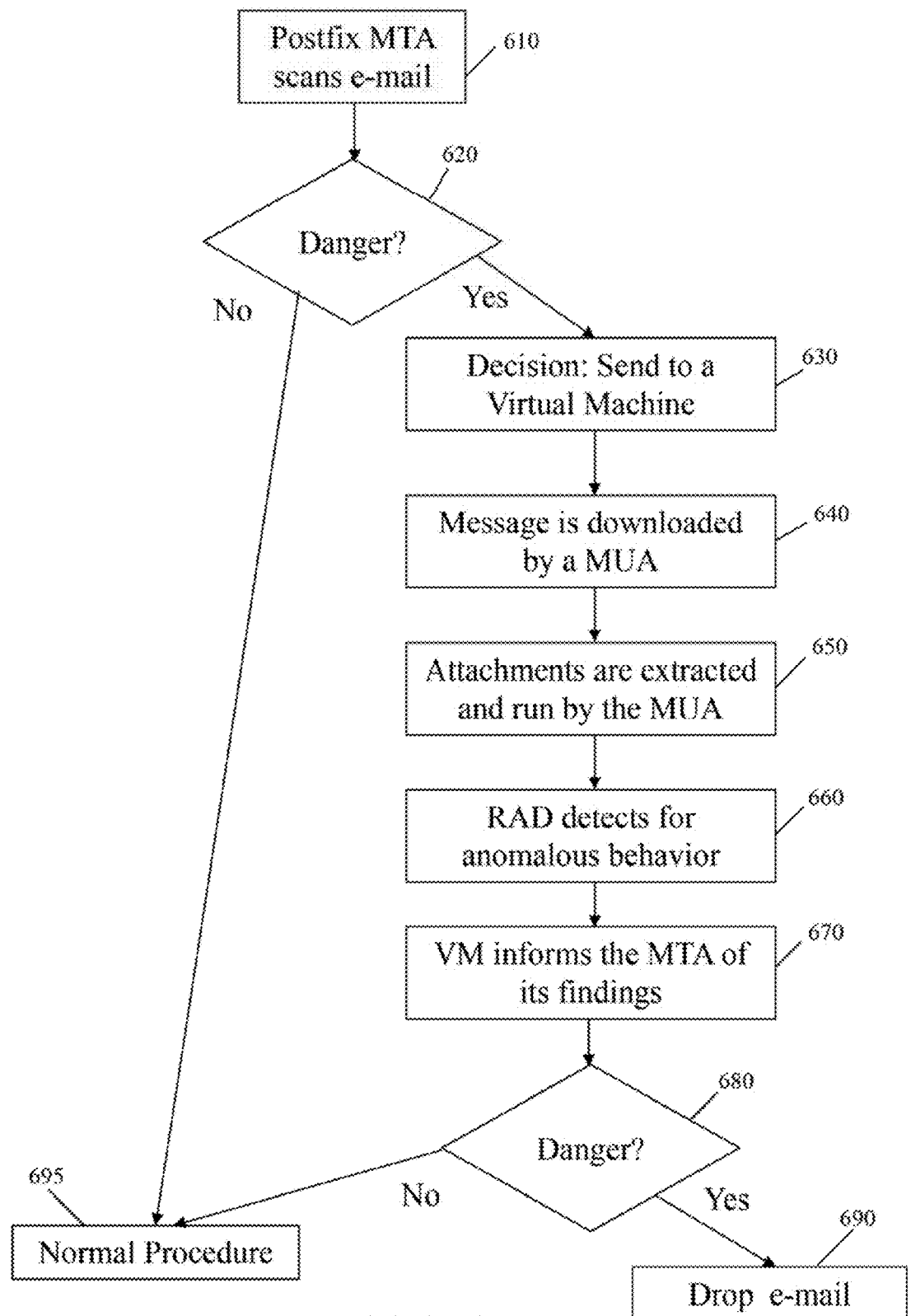
FIG. 6 is a simplified illustration of another embodiment of a method for protecting an application from attacks in accordance with the disclosed subject matter.

As discussed above, an IDS can detect anomalous behavior, such the behavior of e-mail worms. In order to acquire the information needed to detect anomalous behavior, the embodiment illustrated in FIG. 5 can use RAD (Registry Anomaly Detection) 520, which monitors, in real-time, accesses to the Windows Registry 550 and detects malicious behavior. The Windows Registry is a database that stores settings and options and is an integral component of the Windows operating system. Furthermore, a majority of programs interact with Windows Registry frequently. These characteristics elevate the Windows Registry to strong candidate position as source of audit data. RAD 520 can attach a sensor to the registry and apply the acquired information to an anomaly detector that can correlate activity that corresponds to malicious software. An advantage of using RAD 520 is its ability to accurately detect anomalous behavior with a low computational overhead. The low overhead makes it a viable solution for real-time detection of malicious software. RAD 520 can construct a data model from features extracted directly from the registry sensor. These features include the name of the process accessing the registry, the type of query sent to the registry, the key that is being accessed.sub.: the response from the registry, and the value of the key that is being accessed. Using the features monitored from the registry accesses, RAD 520 can build a model from normal (non-attack) data. This model can be used to classify registry accesses as either normal or malicious. in conjunction with FIG. 5, FIG. 6 illustrates a process for protecting a computer from attack according to some embodiments of the disclosed subject matter. As shown, an e-mail is received from a network and scanned, at 610, by MTA 540. If the MTA 540 determines, at 620, that the e-mail is not a potential danger, it can handle the e-mail according to standard procedures 695. If the MTA 540 determines, at 620, that the email is a potential danger, it can forward the e-mail, at 630, to a virtual machine 510. Upon receipt in the virtual machine 510, the e-mail can be downloaded, at 640, by MUA 530. Any attachments can be extracted and run by the MUA 530, at 650. This can result in interactions with the Windows Registry 550. Registry Anomaly Detection (RAD) 520 can observe this behavior and decide, at 660, if the behavior is outside of normal parameters. The virtual machine 510 or RAD 520 can inform the MTA 540, at 670, if it was decided that the e-mail contained dangerous attachments. Based at least in part on this information, MTA 540, can decide, at 680, to drop the e-mail, at 690, or follow normal procedures, at 695, by for example, delivering the e-mail.

Figure 7:
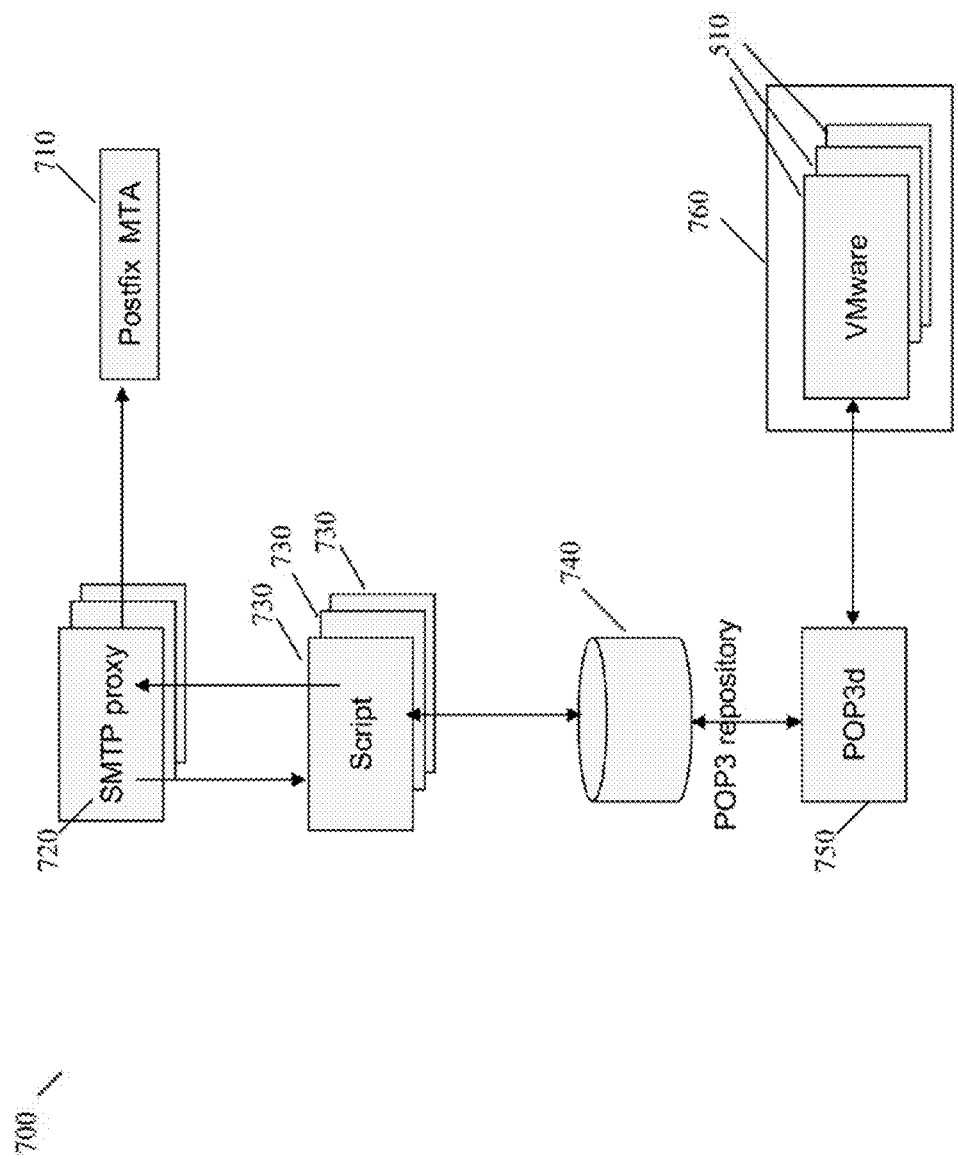
FIG. 7 is block diagram of a system for use in monitoring electronic messages and protecting applications from attacks in accordance with some embodiments of the disclosed subject matter.

MTA 540 can be implemented using any appropriate mailer, for example, Postfix. One illustrative embodiment of MTA 540 can have a front end that uses the smtp.proxy open-source package. FIG. 7 is a diagram illustrating an example front end for MTA 540 and components of MTA 540. In this diagram, Smtp.proxy 720, Post Office Protocol version 3 (POP3) repository 740, and Post Office Protocol version 3 daemon (POP3D) 750 represent this portion of MTA 540 of FIG. 5. Smtp.proxy 720 can be software that listens on the SMTP port (i.e., port 25) and waits for incoming SMPT connections. Upon arrival of an SMTP connection, the proxy 720 can contact the MTA 710 and go through the initial phase of HELO/MAIL/RCPT commands. A benefit of this embodiment is that the proxy does not need to now any special site-specific restrictions on, for example, acceptable domains or anti-spam measures, that can have been put in place by a Postfix administrator. When a remote MTA (for example, the MTA of a user who is sending an e-mail to a user on system 700) sends the DATA command, followed by the body of the e-mail message, the proxy 720 can save the DATA command in a uniquely named temporary file and invoke a script 730 after it has received the entire message, but before it responds to the DATA command of the remote MTA.

An instance of script 730 can be forked for every message received. It therefore can keep a tally of the number of scripts 730 that are currently running and waiting for a VM to become available. The script can also wait for an indication as to whether or not a possible attack has been detected. A limit of the number of instances can be chosen so that the queue of unprocessed messages does not grow steadily. If this limit is exceeded, a script 730 can cause an error condition, such as, returning a "451 transient error, try again later" message. Smtp.proxy can pass that message on to the remote MIA so that the mail message can be processed at a later time. The local copy of the message can then be removed. Script 730 can run the file with the contents of the e-mail message through a Multipurpose Internet Mail Extensions (MIME) normalizer. Script 730 can pass a copy of the message on to one of the virtual machines and wait for the VM to finish processing. The copy passed to the VM can include an extra header with the IP address and port to contact (e.g., 128.59.16.20:12588). The VM can respond with an indication as to whether the message is acceptable or not. If the message is deemed safe, script 730 can return with a "0" exit code, at which point smtp.proxy can pass the file on to the MTA 710 for eventual delivery. Otherwise, a "554 permanent error" response can be given to the proxy, which can pass it on to the remote MTA. The copy of the message can be discarded, a script 730 can exit, and another queued message can be processed.

Messages can be passed on to the VM cluster 760, from a script 730, using a pull model or a push model. Selecting the pull model, for example, can make the implementation easier. Using the pull model, script 730 can deposit every message in a POP3 repository 740, for example, using the Unix mail file format. As each VM becomes available, the topmost (oldest) message can be pulled from the P0P3 server and processed, and then the VM can connect to the TCP port specified in the header. To ward against VM cluster failures or excessive load, each blocked script 730 process can time out after a given amount of time. This time can be permanent or user configurable. If this timeout occurs, the corresponding message can be removed from the POP3 server and a "451" error code can be sent to the remote MTA to indicate a transient error. In this case, the remote MTA can attempt to re-send the message at a later time. It should be noted that software, such as the POP3D 750, can be used for communications utilizing an internet protocol, such as POP3.

The systems illustrated in FIG. 5 and FIG. 7 can have multiple virtual machines making up a virtual machine cluster 410 or 760. Each virtual machine can run its own operating system and can coexist on a single real machine, or alternately be spread among a plurality of real machines. Potentially dangerous applications can thus be isolated from each other by running them in separate virtual machines. A single VMware image 510 that contains an already-trained model for a host-based IDS, for example RAD 520, and the applications that are being tested, for example, standard Microsoft products (Office, Outlook, Outlook Express, Messenger, etc.) and various other popular applications. VMWare image 510 can have a settable disk mode that can control the external behavior of the VMWare image 510. The VMware image 510 can be used for a single detection session that tests a single e-mail attachment at a time. For this purpose, the VMware disk mode can be set to non-persistent, so that any changes made to disk are lost when the virtual machine is terminated, Having the disk in non-persistent mode can allow for the use of a repeatable-resume feature. Repeatable-resume features allows for a virtual machine to quickly start from a resumed state, thereby bypassing the need to reboot the operating system any time a new virtual machine environment is needed.

In some embodiments of the disclosed subject matter, scalability and reliability can be considered. Increasing scalability can increase the performance of an of e-mail worm detection architecture in a large-scale enterprise environment. Reduction of the rate of false positives can be achieved by combining the RAD 520 system with additional detectors, such as the Windows Event Log data. This combination can allow for the use of data correlation algorithms that can be used to improve behavior models. Reducing the time needed to detect malicious activity can be achieved by retrofitting MUAs to reduce the delay of checking and downloading messages. Reliability can help in dealing with complex issues such as targeted attacks against the system and encrypted e-mail.

One of the assumptions that can be made in various embodiments of the disclosed subject matter is that the virtual machine can mimic the behavior of an operating system. If a worm can detect the presence of a virtual machine, it could potentially vary its behavior avoiding detection. Therefore, in some embodiments, a virtual machine that can conceal its presence to the guest operating system is selected. In the absence of obvious clues from the VM, there are techniques that an attacker can use to detect the presence of a virtual machine such as, for example, timing attacks. Logic can be inserted into system 400 that identifies such techniques and inhibits the attackers from success.

Although the present invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow.

What is claimed is:

1. A method for protecting a digital data processing device from attack, the method comprising:
   receiving a first electronic mail;
   sending the first electronic mail to a first computing device that opens at least a first attachment in the first electronic mail, determines whether anomalous behavior occurs subsequent to opening the first attachment, and generates feedback when anomalous behavior is determined to have occurred;
   receiving a second electronic mail at a second computing device; and
   based on the feedback:
   determining that a second attachment in the second electronic mail matches the first attachment in the first electronic mail; and
   in response to determining that the second attachment matches the first attachment, performing filtering on the second electronic mail.

2. The method of claim 1, wherein the first computing device is a virtual machine.

3. The method of claim 2, wherein the first computing device executes a mail user agent to receive the first electronic mail and open the first attachment.

4. The method of claim 1, wherein the second computing device is a server executing a mail transport agent.

5. The method of claim 1, wherein the first attachment is an executable attachment, and wherein opening the first attachment comprises causing the first computing device to execute the first attachment.

6. The method of claim 1, wherein the first attachment is a hyperlink, and wherein opening the first attachment comprises causing the first computing device to select the first attachment, which causes the first computing device to request a document specified by the hyperlink.

7. The method of claim 1, wherein determining that a second attachment in the second electronic mail matches the first attachment in the first electronic mail comprises determining that the second attachment is identical to the first attachment.

8. A system for protecting a digital data processing device from attack, the system comprising:
   at least one hardware processor that:
   receives a first electronic mail;
   sends the first electronic mail to a first computing device that opens at least a first attachment in the first electronic mail, determines whether anomalous behavior occurs subsequent to opening the first attachment, and generates feedback when anomalous behavior is determined to have occurred;
   receives a second electronic mail at a second computing device; and
   based on the feedback:
   determines that a second attachment in the second electronic mail matches the first attachment in the first electronic mail; and
   in response to determining that the second attachment matches the first attachment, performs filtering on the second electronic mail.

9. The system of claim 8, wherein the first computing device is a virtual machine.

10. The system of claim 9, wherein the first computing device executes a mail user agent to receive the first electronic mail and open the first attachment.

11. The system of claim 8, wherein the second computing device is a server executing a mail transport agent.

12. The system of claim 8, wherein the first attachment is an executable attachment, and wherein opening the first attachment comprises causing the first computing device to execute the first attachment.

13. The system of claim 8, wherein the first attachment is a hyperlink, and wherein opening the first attachment comprises causing the first computing device to select the first attachment, which causes the first computing device to request a document specified by the hyperlink.

14. The system of claim 8, wherein the determining that a second attachment in the second electronic mail matches the first attachment in the first electronic mail comprises determining that the second attachment is identical to the first attachment.

15. A non-transitory computer-readable medium containing computer executable instructions that, when executed by a processor, cause the processor to perform a method for protecting a digital data processing device from attack, the method comprising:
   receiving a first electronic mail;
   sending the first electronic mail to a first computing device that opens at least a first attachment in the first electronic mail, determines whether anomalous behavior occurs subsequent to opening the first attachment, and generates feedback when anomalous behavior is determined to have occurred;
   receiving a second electronic mail at a second computing device; and
   based on the feedback:
      determining that a second attachment in the second electronic mail matches the first attachment in the first electronic mail; and
      in response to determining that the second attachment matches the first attachment, performing filtering on the second electronic mail.

16. The non-transitory computer-readable medium of claim 15, wherein the first computing device is a virtual machine.

17. The non-transitory computer-readable medium of claim 16, wherein the first computing device executes a mail user agent to receive the first electronic mail and open the first attachment.

18. The non-transitory computer-readable medium of claim 15, wherein the second computing device is a server executing a mail transport agent.

19. The non-transitory computer-readable medium of claim 15, wherein the first attachment is an executable attachment, and wherein opening the first attachment comprises causing the first computing device to execute the first attachment.

20. The non-transitory computer-readable medium of claim 15, wherein the first attachment is a hyperlink, and wherein opening the first attachment comprises causing the first computing device to select the first attachment, which causes the first computing device to request a document specified by the hyperlink.

21. The non-transitory computer-readable medium of claim 15, wherein determining that a second attachment in the second electronic mail matches the first attachment in the first electronic mail comprises determining that the second attachment is identical to the first attachment.

* * * * *

UNITED STATES PATENT AND TRADEMARK OFFICE
CERTIFICATE OF CORRECTION

PATENT NO.         : 9,544,322 B2                                   Page 1 of 1
APPLICATION NO.    : 14/841233
DATED              : January 10, 2017
INVENTOR(S)        : Stylianos Sidiroglou et al.

It is certified that error appears in the above-identified patent and that said Letters Patent is hereby corrected as shown below:

On the Title Page

Abstract, item 57:

Line 6, "data processing device from attach" should be --data processing device from attack--.

Line 8, "executing the al least" should be --executing the at least--.

Signed and Sealed this
Eleventh Day of April, 2017

Michelle K. Lee
*Director of the United States Patent and Trademark Office*